United States Patent
Jimenez, Jr. et al.

(10) Patent No.: US 10,908,098 B1
(45) Date of Patent: Feb. 2, 2021

(54) AUTOMATIC METHOD OF MATERIAL IDENTIFICATION FOR COMPUTED TOMOGRAPHY

(71) Applicant: National Technology & Engineering Solutions of Sandia, LLC, Albuquerque, NM (US)

(72) Inventors: Edward Steven Jimenez, Jr., Albuquerque, NM (US); Isabel Gallegos, Albuquerque, NM (US); Adriana Stohn, Chandler, AZ (US); Srivathsan Koundinyan, Highland Park, NJ (US); Kyle Thompson, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 38 days.

(21) Appl. No.: 16/456,235

(22) Filed: Jun. 28, 2019

(51) Int. Cl.
*G01N 23/046* (2018.01)
*G06K 9/44* (2006.01)
*G06K 9/62* (2006.01)

(52) U.S. Cl.
CPC .......... *G01N 23/046* (2013.01); *G06K 9/44* (2013.01); *G06K 9/6219* (2013.01); *G01N 2223/401* (2013.01)

(58) Field of Classification Search
CPC .......... G01N 23/046; G01N 2223/401; G06K 9/6219; G06K 9/44
See application file for complete search history.

(56) References Cited

U.S. PATENT DOCUMENTS

| 2010/0128844 | A1* | 5/2010 | Thomsen | G06T 7/11 378/53 |
| 2016/0123904 | A1* | 5/2016 | Masood | G01N 23/046 382/131 |
| 2018/0114314 | A1* | 4/2018 | Butler | G06K 9/40 |

FOREIGN PATENT DOCUMENTS

GB 2454782 A * 5/2009 ............. G01N 23/04

OTHER PUBLICATIONS

Gallegos et al. "Unsupervised Learning Methods to Perform Material Identification Tasks on Spectral Computed Tomography Data." Proceedings SPIE 10763, Radiation Detectors in Medicine, Industry, and National Security XIX, Sep. 11, 2018, 15 pages (Year: 2018).*

(Continued)

*Primary Examiner* — Jon Chang
(74) *Attorney, Agent, or Firm* — Martin I. Finston

(57) ABSTRACT

A method is provided for isolating and labeling discrete features in a spectral radiographic image recorded as a set of images in different energy channels. The disclosed method involves creating a profile for each of at least some pixels in the spectral radiographic image. The profiles are sequences of pixel values, in which each pixel value is a photon count or a similar radiographic exposure value indicative of the attenuation of a portion of the scanning beam in a respective energy channel. Iterative hierarchical clustering is used to cluster the pixels on the basis of their respective profiles. Labels are assigned to one or more of the resulting clusters. In implementations, each label can be associated with an inferred material composition or with an inference that the material composition is unknown.

7 Claims, 14 Drawing Sheets

(56) References Cited

OTHER PUBLICATIONS

Berkhin, P., "A Survey of Clustering Data Mining Techniques," Grouping Multidimensional Data Recent Advances in Clustering (2006) Kogan, J. et al. (eds.) Springer-Verlag Berlin Heidelberg, pp. 25-71.
Chuang, K.-S. et al., "Fuzzy c-means clustering with spatial information for image segmentation," Computerized Medical Imaging and Graphics (2006) 30:9-15.
Collins, N. et al., "An experiment for material classifications using multichannel radiographs," Review of Progress in Quantitative Nondestructive Evaluation (2016), 5 pages.
Elbatta, M. T. H. et al., "A Dynamic Method for Discovery Density Varied Clusters," International Journal of Signal Processing, Image Processing and Pattern Recognition (2013) 6(1):123-134.
Ester, M. et al., "A Density-Based Algorithm for Discovering Clusters A Density-Based Algorithm for Discovering Clusters in Large Spatial Databases with Noise," KDD-96 Proceedings (1996), pp. 226-231.
Irani, J. et al., "Clustering Techniques and the Similarity Measures used in Clustering: A Survey," International Journal of Computer Applications (2016) 134(7), 6 pages.
Jain, A. K., "Data clustering: 50 years beyond K-means," Pattern Recognition Letters (2010) 31:651-666.
Ji, Z. et al., "Fuzzy c-means clustering with weighted image patch for image segmentation," Applied Soft Computing (2012) 12:1659-1667.
Jimenez, E. S. et al., "Object Composition Identification via Mediated-Reality Supplemented Radiographs," IEEE Nuclear Science Symposium and Medical Imaging Conference (2014) Seattle, WA, Nov. 8-15, 6 pages.
Jimenez, E. S. et al., "Developing Imaging Capabilities of Multi-Channel Detectors Comparable to Traditional X-Ray Detector Technology for Industrial and Security Applications," Proc. SPIE 9969, Radiation Detectors: Systems and Applications XVII, 99690A (Oct. 3, 2016), 11 pages.
Jimenez, E. S. et al., "Leveraging Multi-Channel X-Ray Detector Technology to Improve Quality Metrics for Industrial and Security Applications," Proc. SPIE 10393, Radiation Detectors in Medicine, Industry, and National Security XVIII, 103930G (Sep. 26, 2017), 12 pages.
Koundinyan, S. P. et al., "Machine Learning for Industrial Material Classification Applications with Color CT Datasets," SAND2018-3139C, Proposed for presentation at the American Society for Nondestructive Testing 27th Research Symposium held Mar. 25-29, 2018 in Orlando, Florida, Sandia National Laboratories (2018), OSTI Identifier 1505436, 15 pages.
Otsu, N., "A Threshold Selection Method from Gray-Level Histograms," IEEE Transactions on Systems, Man, and Cybernetics (1979) SMC-9(1):62-66.
Parsons, L. et al., "Subspace Clustering for High Dimensional Data: A Review," Sigkdd Explorations (2004) 6(1):90-105.

\* cited by examiner

AUTOMATIC METHOD OF MATERIAL IDENTIFICATION FOR COMPUTED TOMOGRAPHY

ACKNOWLEDGEMENT OF GOVERNMENT SUPPORT

This invention was made with United States Government support under Contract No. DE-NA0003525 between National Technology & Engineering Solutions of Sandia, LLC and the United States Department of Energy/National Nuclear Security Administration. The United States Government has certain rights in this invention.

FIELD OF THE INVENTION

The invention relates generally to machine learning techniques for classifying elements of recorded images, and more specifically to applications of such techniques in nondestructive testing.

ART BACKGROUND

Computed tomography (CT) is a critical tool in the non-destructive analysis of objects and materials. CT can be notionally described as follows: A three-dimensional test object to be scanned is effectively sliced into a stack of two-dimensional (2D) sections. Each section is projected onto a detector array by a beam of radiation. X-radiation is typical, but other forms of radiation can also be used.

The beam source and the detector array are diametrically opposed to each other, and the test object lies between them. Multiple projections are recorded at discrete angular positions of the source and detector as they rotate in concert about the object. After a given section of the object has been scanned in this manner, the apparatus advances to scan a new section of the object. The scanned object is computationally reconstructed from the recorded detector data. We refer to a resulting image as a CT radiograph.

Traditional CT methods use bremsstrahlung radiation sources that scan the object with a beam that contains spectrally continuous broadband radiation. Although useful, these approaches suffer from noise and artifacts due, among other reasons, to lack of penetration and to nonlinearities in material absorption.

One such nonlinearity that is especially troublesome is beam hardening. In beam hardening, absorptive features in the object behave as high-pass filters; that is, they tend to attenuate the lower-energy components of the scanning beam, while passing the higher-energy components. Because the higher-energy components are more penetrating, a downstream feature of the object is likely to absorb a smaller energy fraction from the filtered beam than it would from the full-spectrum beam.

This causes the apparent absorbtivities of features of the object to be path-dependent; that is, the apparent absorptivity depends on the upstream features that the beam has already passed through. Among other problems, this produces inconsistencies in the apparent absorptivity of a given volume element of the object when it is irradiated at different angles of incidence during a scan. These inconsistencies lead to noise in the reconstructed image.

In spectral CT, energy-resolved detector data are used to create multichannel CT reconstructions. The spectral resolution provided by this approach can lead to images of higher quality. Spectral CT data also provide additional information that can be used to identify and analyze materials. Some features of spectral CT are reported in Noelle M. Collins, Kyle R. Thompson, and Edward S. Jimenez, "An experiment for material classifications using multichannel radiographs," *Review of Progress in Quantitative Nondestructive Evaluation* (July 2016), and in Edward S. Jimenez, Laurel J. Orr, and Kyle R. Thompson, "Object composition identification via mediated-reality supplemented radiographs," *IEEE Nuclear Science Symposium and Medical Imaging Conference* (November 2014).

In principle, material compositions in the scanned object can be identified from a spectral CT radiograph by analyzing beam attenuation according to the Lambert-Beer law, i.e., $I(\varepsilon)=I_0(\varepsilon)\, e^{-\mu(\varepsilon)x}$, where $I(\varepsilon)$ is the photon count at energy $\varepsilon$, x is the source-to-detector distance traversed by the photon, and $\mu(\varepsilon)$ is the attenuation coefficient. However, accurately determining $\mu(\varepsilon)$ is often intractable in practice. It would therefore be useful to have a method of material identification that does not need to analyze attenuation according to the Lambert-Beer law.

SUMMARY OF THE INVENTION

We have developed a method that combines techniques of machine learning with high-energy spectral x-ray computed tomography data to identify material compositions within each reconstructed voxel in the field-of-view of a CT apparatus. (A "voxel" is a volume element of the object that is scanned.) With our method, it is not required to analyze attenuation according to the Lambert-Beer law. Instead, material signatures are identified using unsupervised clustering procedures.

We have shown that our unsupervised clustering procedures can differentiate isolated materials with highly similar compositions. When this methodology is applied to spectral computed tomography data, materials can potentially be identified more accurately than is achieved using traditional single-channel computed tomography data. Our methodology can also reliably identify materials even if artifacts render several voxels unusable.

Accordingly, the invention in example embodiments involves creating a profile for each of at least some pixels in a spectral radiographic image. By "spectral" is meant that the radiographic image is recorded as a set of images in different energy channels. By "profile" is meant a sequence of pixel values, each relating to a respective energy channel. Each pixel value is a photon count or a similar radiographic exposure value indicative of the attenuation of a portion of the scanning beam.

The pixels are clustered on the basis of their respective profiles. The clustering is carried out using an iterative hierarchical clustering (i.e., "iterative HC") procedure in which each HC iteration (except the last one) eliminates one or more clusters from the data set on which the HC is performed.

Labels are assigned to one or more of the resulting clusters, and each label is associated with an inferred material composition or with an inference that the material composition is unknown.

For processing, the spectral radiographic image and the profiles are stored in a computer-accessible digital medium or in computer-accessible digital media. At least the steps of profile creation, clustering, and labeling are carried out using a computer or other digital data-processing device.

Various embodiments also include preprocessing the radiographic image to more distinctly define discrete components of the test object before the pixels are clustered. Example preprocessing techniques include multilevel thresholding, erosion, and smoothing, any of which may be used singly or in any combination.

Various embodiments also include computing a mean profile, or in other words a mean vector of radiographic exposure values, for each labeled cluster. The mean profiles are then used as a basis for associating material compositions with the respective labels.

In various embodiments, the spectral radiographic image comprises a set of reconstructed computer tomographic (CT) images that are all of the same slice, i.e. the same planar section, of the test object, but that are recorded in different energy channels.

Various embodiments further include creating the spectral radiographic image. In examples, this image is created from a CT exposure of the test object, carried out so as to produce a respective sinogram of the test object in each of the different energy channels. The sinograms are processed to reconstruct the radiographic image.

BRIEF DESCRIPTION OF THE DRAWINGS

FIG. 5A shows a binarized radiograph before erosion. FIG. 5B shows the binarized radiograph after erosion. FIG. 5C indicates the pixels that have been removed in the erosion process.

FIG. 6A is a composite pixel profile taken before pre-processing, and FIG. 6B is the corresponding profile taken after the preprocessing steps of erosion and smoothing.

FIG. 7 is a comparative bar graph in which the mean pixel value for each of six ceramic materials, as measured before pre-processing, is paired with the corresponding mean pixel value after erosion and smoothing. FIG. 8 is a comparative bar graph in which the respective standard deviations of the values in FIG. 7 as measured before pre-processing are paired with the corresponding standard deviations after erosion and smoothing.

FIG. 11 shows the label assignments under agglomerative hierarchical clustering. FIG. 12 shows the label assignments under k-means clustering. FIG. 13 shows the label assignments under DBSCAN. FIG. 14 shows the label assignments under our new iterative hierarchical clustering.

FIG. 17 shows the label assignments under k-means clustering. FIG. 18 shows the label assignments under iterative hierarchical clustering.

FIG. 20A shows profiles from the testing data. FIG. 20B shows profiles from the training data. It is identical to FIG. 3, discussed above. FIG. 20C shows the material identifications made on the testing data.

FIG. 21 is a comparative bar graph in which, for each of the six materials, a bar representing the number of pixels in the testing set that were correctly identified is juxtaposed to a bar representing the number of pixels that were incorrectly identified, and to a bar representing the ground truth.

FIG. 22 is a bar graph in which each bar represents a respective one of the six materials. Each bar is partitioned among the number of pixels correctly identified, the number of pixels incorrectly identified, and the number of pixels that remained unlabeled.

DETAILED DESCRIPTION

Figure 1:
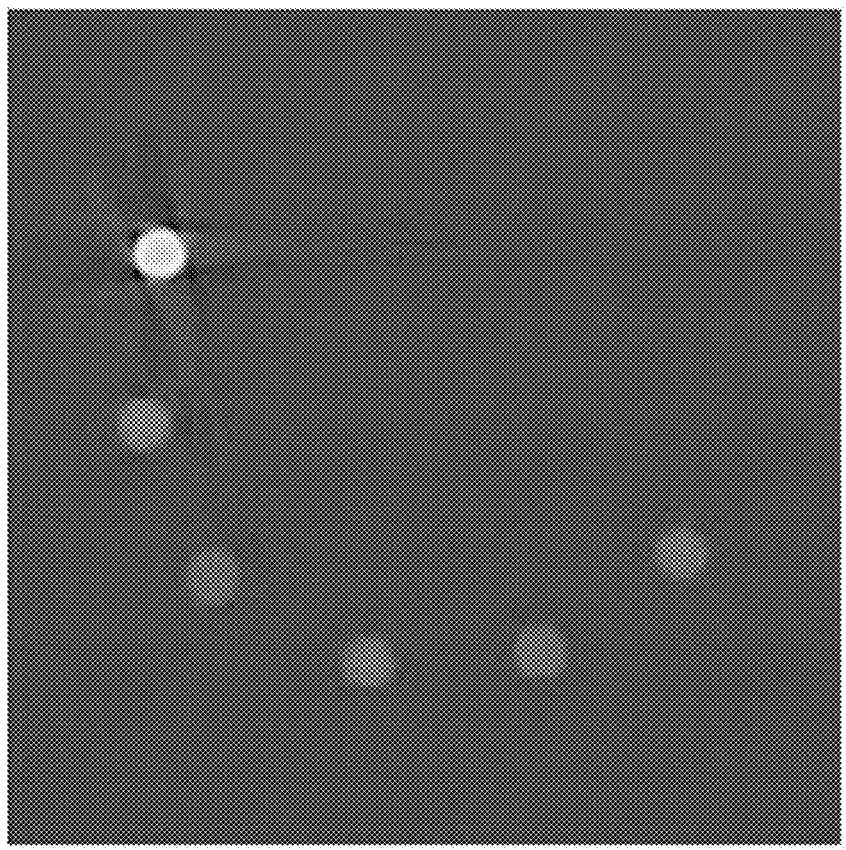
FIG. 1 is an example spectral CT radiograph of a test object consisting of six ceramic cylinders of different compositions.

Image segmentation is an important component in the analysis of CT scans. In image segmentation, the scan is partitioned into respective components on the basis of pixel characteristics. The segmentation results help to identify and evaluate different materials in the image.

Image segmentation algorithms fall broadly into two categories: supervised approaches and unsupervised approaches. The example provided below illustrates an unsupervised approach. By contrast, one example of a supervised approach is described in S. Koundinyan et al., *Machine Learning for Industrial Material Classification Applications with Color CT Datasets*, SAND2018-3139C, Proposed for presentation at the American Society for Nondestructive Testing 27th Research Symposium held Mar. 25-29, 2018 in Orlando, Fla., Sandia National Laboratories (2018), OSTI Identifier 1505436.

Some of the well-known unsupervised algorithms for image segmentation are distance-based clustering algorithms. These include centroid-based algorithms, density-based algorithms, and connectivity-based algorithms. All of these algorithms find relationships between data points by examining the similarity or dissimilarity between pairs of objects, or collections of objects, in a dataset. Similarity is measured by a distance metric, for example the Euclidean distance, the cosine distance, or the Manhattan distance. Euclidean distance is the distance metric in the example provided below.

Each of the various algorithms operates well only for datasets that satisfy a limited range of conditions and constraints. For example, k-means clustering, a type of centroid-based clustering, works well if it can be assumed that the clusters are hyperspherical or hyperellipsoidal. DBSCAN, which is a density-based approach, can find arbitrarily-shaped clusters, but only if it can be assumed that density is uniform and that it is similar across clusters.

Our approach, as described in the example below, is an extension of agglomerative hierarchical clustering. Agglomerative hierarchical clustering is a connectivity-based approach that forms a nested hierarchy of clusters. The conventional process begins by forming singleton clusters of each point in the dataset. The process then merges nearby clusters. The merging of clusters continues, step-by-step, until at the final step all clusters have been merged into a single cluster containing all points in the dataset.

The decisions for merging clusters are based on the distance metric and on a second metric, the linkage metric. The linkage metric measures the distance between clusters. For example, a single-linkage metric finds the minimum distance between points in the clusters to determine their similarity. Conversely, complete-linkage metric finds the maximum distance between points in the clusters. A single-linkage metric is adopted in the example presented below.

As noted above, our approach is an extension of the conventional approach. We refer to our approach as iterative hierarchical clustering. An important distinction is that in our approach, we apply the hierarchical clustering procedure iteratively, and instead of separating the data into multiple clusters in each iteration, we apply the procedure as a binary classifier.

In each iteration, the dataset is reduced by removing points that have already been clustered. As a consequence, different clusters can have different densities. For example, once a cluster of low density has been labeled and removed from the dataset, the algorithm will subsequently perform only on higher-density clusters. Hence it will suffer less hindrance from what would otherwise be highly variable cluster distributions.

In an illustrative example, our method was used to analyze a spectral CT radiograph of an object that consisted of six ceramic cylinders of different materials, arranged in a circle. FIG. 1 is an example radiograph of the six cylinders. For each dataset, we selected and analyzed a single slice. Hence only two-dimensional pixels, rather than three-dimensional voxels, are analyzed in the example reported here.

As seen in the figure, proceeding clockwise from the cylinder at the lower right, the cylinder compositions are: room-temperature glass mica, high-temperature glass mica, alumina-silicate, alumina-bisque, alumina, and water-resistant zirconia. The spatial separations of the cylinders from each other reduce beam-hardening artifacts. However, similarities among some of the cylinder compositions pose a strenuous test of discriminatory power.

Figure 2:
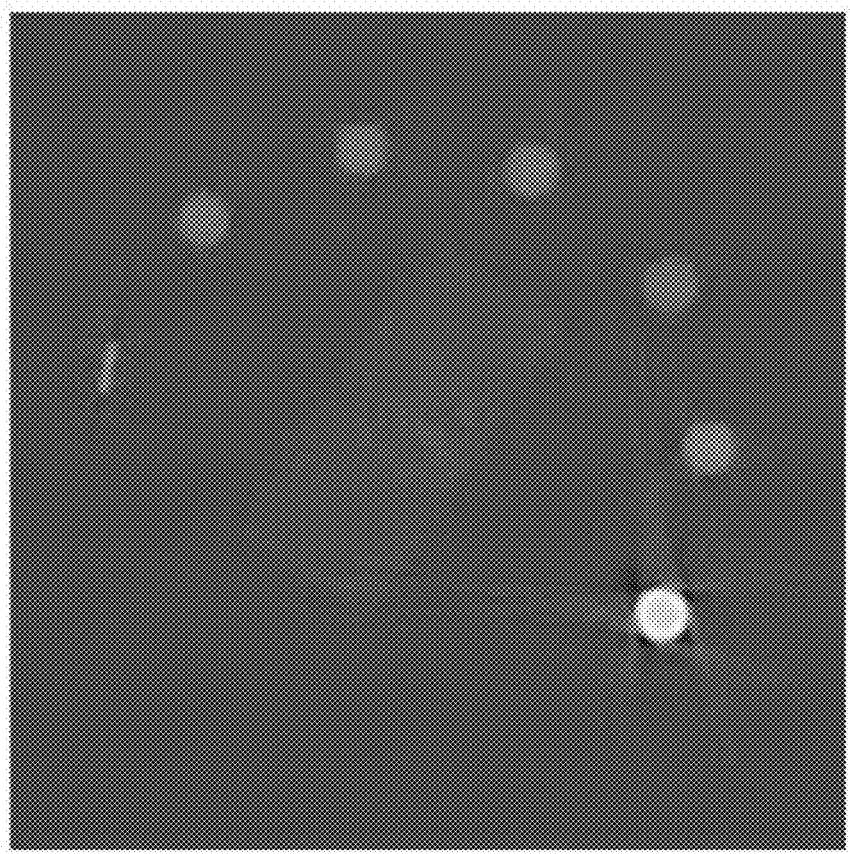
FIG. 2 is an example spectral CT radiograph of a test object consisting of the six ceramic cylinders of the preceding figure, with a steel penny and a wood block added to the arrangement.

In a variation, a steel penny was added to the circular arrangement of ceramic cylinders, and a wood block was added to the center of the arrangement. X-ray absorption by the penny and block created additional beam-hardening artifacts, thus making the ceramic cylinders more difficult to identify. An example radiograph of the example including the penny and wood block is shown in FIG. 2.

In another variation, the CT radiograph (with and without the added steel penny and wood block) was reconstructed from filtered sinogram data that were summed over the various energy channels to simulate traditional single-channel reconstruction. We expected greater prevalence of beam-hardening artifacts in this reconstruction, which would add difficulty to the material identification.

A sinogram, in this regard, is a raw record of a scan. It is a 2D image corresponding to the scan of a single planar section of the object. The sinogram is compiled from a series of projections, arranged one above the other in the 2D image. Each projection is the "horizontal" one-dimensional image recorded by the detector array at one angular position of the source and detector. The projections recorded for successive angular scan positions are arranged in vertical sequence. According to the well-known Fourier slice theorem (also referred to as the "projection-slice theorem"), the one-dimensional Fourier transform of each of these projections is equivalent to a slice, taken through the origin, of F2, where F2 is the two-dimensional Fourier transform of the scanned section of the object.

In the Fourier transforms mentioned above, the conjugate variables are position and spatial frequency. An inverse Fourier transform can be used to reconstruct the object from the sinogram, but the sinogram must be filtered in order to account properly for the contributions from higher spatial frequencies.

In experimental trials, we acquired CT data using the high-energy spectral x-ray computed tomography system described in Edward S Jimenez, Kyle R Thompson, Adriana Stohn, and Ryan N Goodner, "Leveraging multi-channel x-ray detector technology to improve quality metrics for industrial and security applications," *Radiation Detectors in Medicine, Industry, and National Security XVIII*, volume 10393, International Society for Optics and Photonics (2017), page 103930G.

The system included a Comet x-ray source and a detector composed of five customized Multix ME100 modules. The source had a maximum beam energy of 450 keV. This relatively high energy was desirable because it increased penetration and because it reduced artifacts, relative to more conventional lower-energy sources. The source had a high flux capability, which enhanced the signal-to-noise ratio.

The detector was a linear array of 640 pixels calibrated for 300 keV across 128 energy channels. The detector produced energy-resolved data, so that when an x-ray photon struck a pixel of the detector, the photon would be binned into one of the 128 channels according to its energy. The source-to-detector distance was approximately 2.05 meters.

In traditional systems, the individual photon energies cannot be determined or resolved. Hence, each voxel in a reconstructed scan has associated with it only a single photon count or other radiographic exposure value that is cumulative across the energy spectrum. Another drawback in traditional systems is that artifacts are more prevalent because of beam hardening by high-density materials, among other factors. Using a multichannel CT system helps to overcome these problems and, in addition, it provides spectral data, not otherwise obtainable, that can be used for material identification.

In our ceramic cylinder experiments, we collected datasets at 250 keV and 0.5 mA with a source-to-object distance of approximately 1.75 meters. For each dataset, a single planar section of the object was selected and analyzed. That is, we did not analyze three-dimensional voxels. We analyzed only two-dimensional images.

Two types of data are associated with each scan: spectral data and spatial data. The spectral data consist of the pixel values for a given pixel across all 128 energy channels, i.e., they constitute a 128-dimensional vector of pixel values. The profile of each pixel is the sequence of pixel values plotted against the channel index. Each of the pixel values is the count of detected photons in the respective energy channel.

Figure 3:
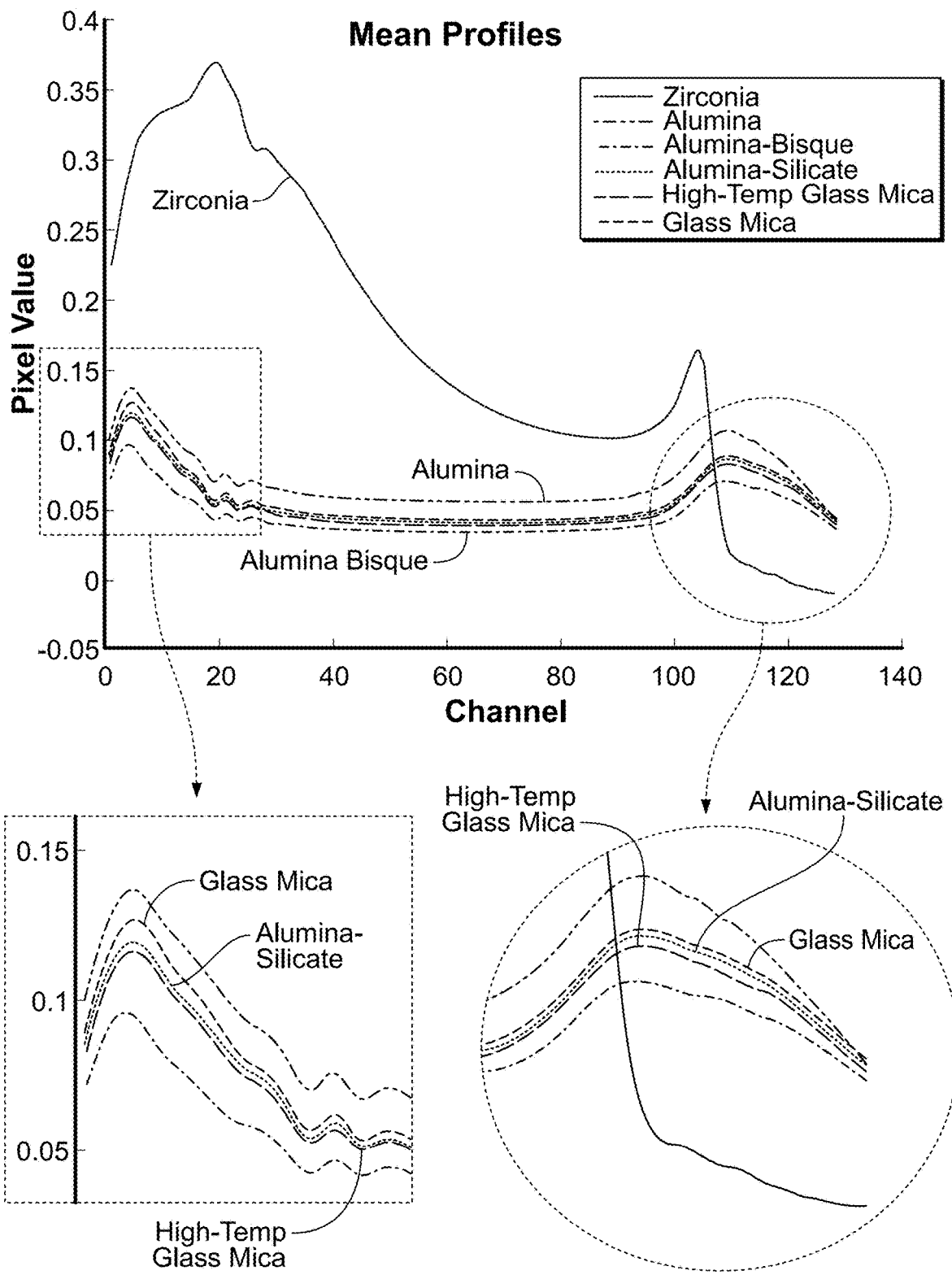
FIG. 3 is an example of spectral data. Each of the curves in the figure is a mean profile for one of the ceramic cylinders of the preceding figures.

FIG. 3 is an example of spectral data. Each of the curves in the figure is a mean profile for one of the ceramic cylinders. In order from top to bottom, the materials that are represented are zirconia, alumina, glass mica, high-temperature glass mica, and alumina bisque. A profile for alumina silicate is also partially visible near the profiles of glass mica and high-temperature glass mica.

The spatial data consist of two-dimensional vectors corresponding to the coordinate locations of the respective pixels in the scan.

Although the separation distances between cylinders suppressed some of the noise and reconstruction artifacts in the CT radiographs, we still observed some artifacts at the cylinder edges. The most significant artifacts appeared around the zirconia cylinder. We believe that is why the spectral data for the pixels corresponding to the zirconia cylinder exhibit the most variance.

Implementation

Overview.

Figure 4:
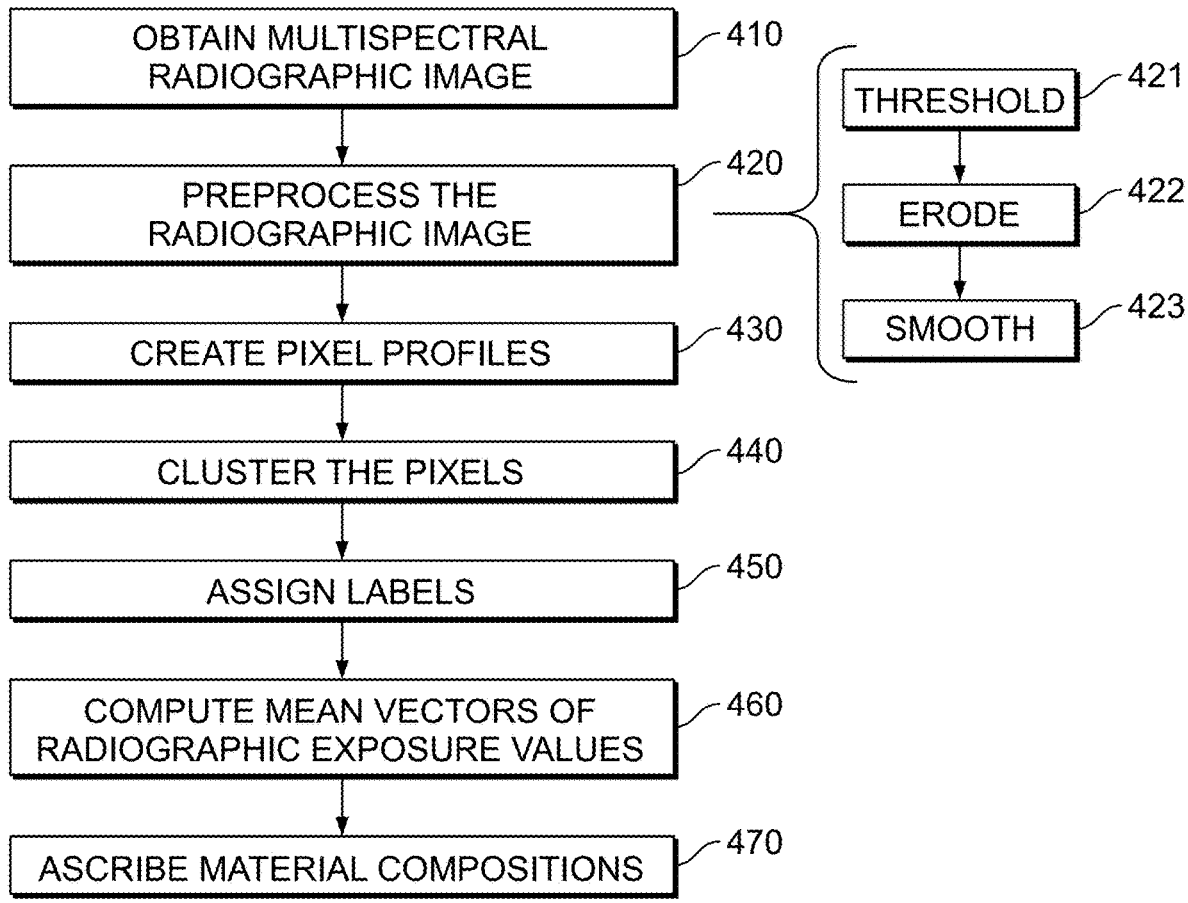
FIG. 4 is a flowchart illustrating, at a high level, our machine-learning method for identifying materials from spectral CT radiographs.

FIG. 4 is a flowchart that illustrates our method in an illustrative example. At block 410, a multispectral radiographic image of the test object is obtained. The radiographic image comprises a set of reconstructed computer tomographic (CT) images of the same slice of the test object, each recorded in a different energy channel. At block 420, the CT images are preprocessed as will be described below. In implementations, the preprocessing includes some or all of thresholding 421, erosion 422, and smoothing 423. At block 430, profiles comprising spectral information are created for pixels in the preprocessed images. Using the profiles, the pixels are clustered at block 440. At least some of the resulting clusters are labeled at block 450, and material compositions are ascribed to the labeled clusters at block 470. In implementations, the ascribing of material compositions is based on mean vectors of radiographic exposure values that are computed at block 460.

Preprocessing.

The datasets for the ceramic cylinders were preprocessed in three steps: multilevel thresholding, eroding of the binary image of the scan, and smoothing with a box filter. The preprocessing was useful because it helped to identify the pixels of interest for analysis, and because it reduced the impact of noise and artifacts during the clustering task. It should be noted that the particular process steps described below are intended only as an illustrative example that should not be taken as limiting.

Multilevel Thresholding.

A single planar section is initially chosen from the dataset. This section has 128 2D greyscale images associated with it, i.e., one image in each of the 128 energy channels. From this set, a single channel is chosen, corresponding to one greyscale image. This image serves as the initial input image.

We apply multilevel thresholding to partition the pixels into a predefined number of classes, based on pixel value. The algorithm used is Otsu's method, which is well-known in the art.

Differences in pixel intensities make it possible for the multilevel thresholding to separate pixels corresponding to materials from pixels corresponding to air. Pixels corresponding to air are discarded, and only pixels corresponding to materials are saved.

Erosion.

As mentioned above, artifacts are seen along the edges of the ceramic cylinders. Erosion of the image addresses this issue. After multilevel thresholding has been performed, the surviving pixels are converted to a binary image. Using a flat disk-shaped structuring element, an erosion operation is performed on the binary image to remove the pixels from around the edges of each isolated cylinder.

Figure 5A:
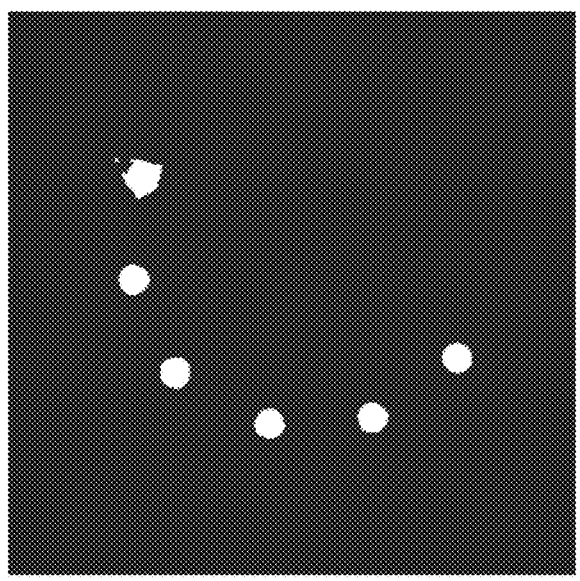
FIGS. 5A-5C illustrate an erosion process that was applied as part of an example procedure for the preprocessing of CT radiographs.
Figure 5B:
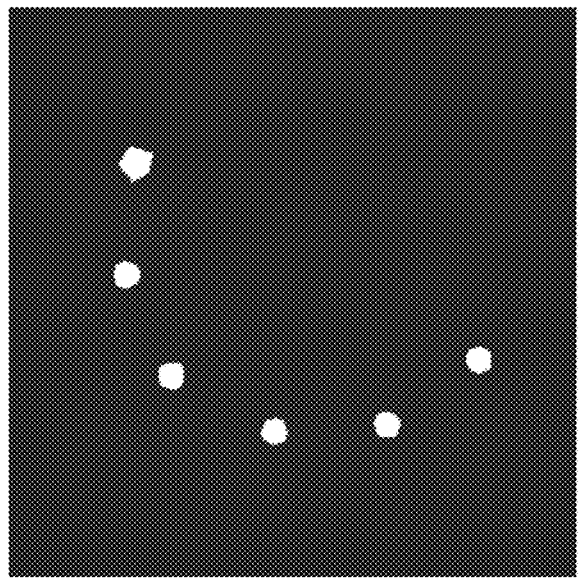
Figure 5C:
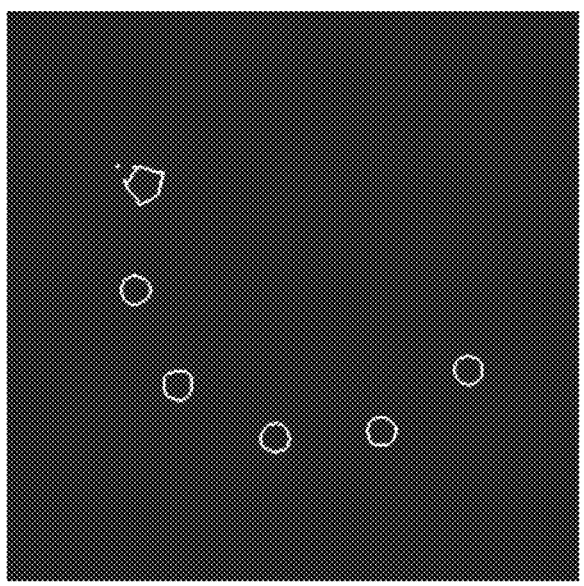

FIGS. 5A-5C illustrate the erosion process. FIG. 5A shows the binarized radiograph before erosion. FIG. 5B shows the binarized radiograph after erosion. FIG. 5C indicates the pixels that have been removed in the erosion process.

Smoothing.

Finally, after the erosion procedure has selected the pixels of interest, a 3×3 box filter is applied to smooth the scan. The box filter is applied to the 2D greyscale image in each of the 128 energy channels.

Figure 6A:
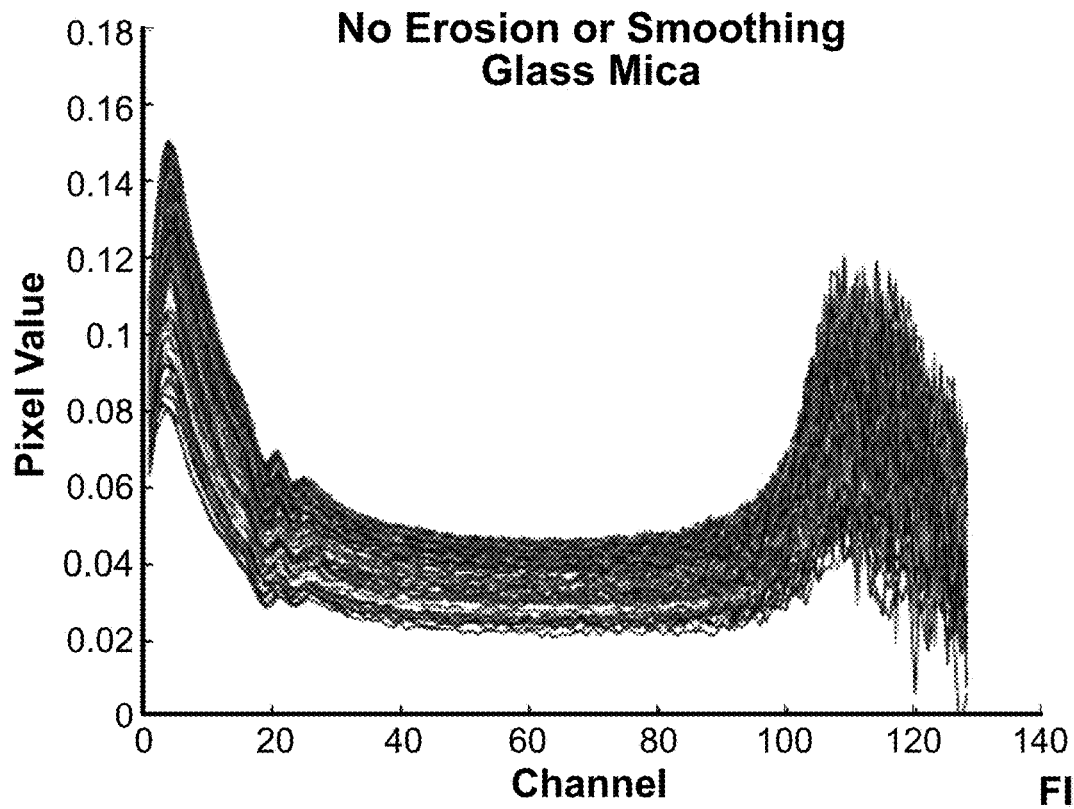
FIGS. 6A and 6B illustrate the effect of preprocessing on spectral data. In the illustrated example, the spectral data are for glass mica.
Figure 6B:
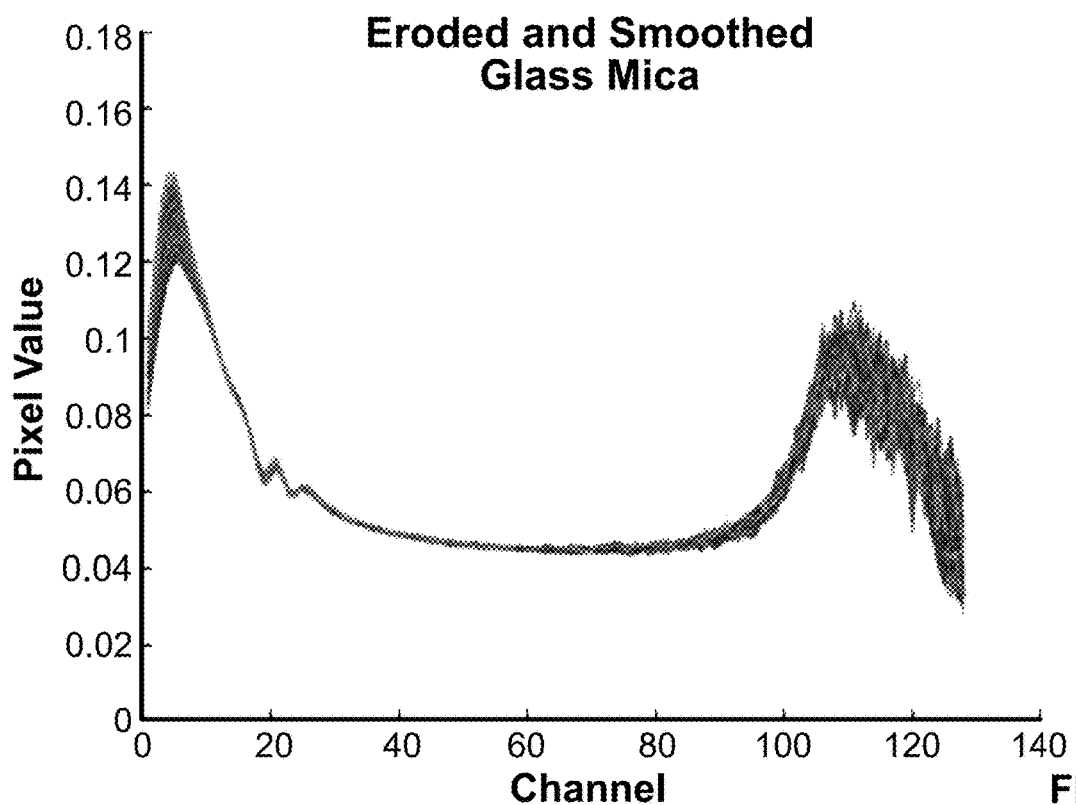

FIGS. 6A and 6B illustrate the effect of erosion and smoothing on the spectral data for glass mica. FIG. 6A is a composite pixel profile taken before pre-processing, and FIG. 6B is the corresponding profile taken after erosion and smoothing.

Accordingly, it will be understood that pre-processing the scan tends to reduce the variance of the spectral data for each material without significantly changing the mean profile.

Figure 7:
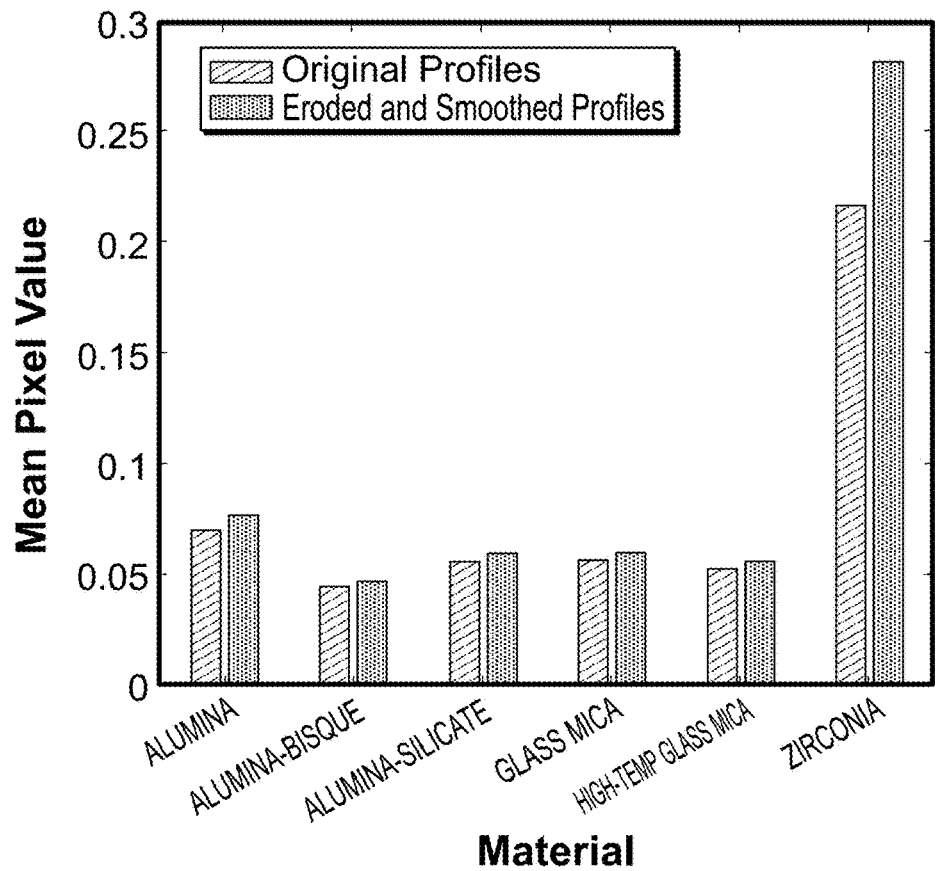
FIGS. 7 and 8 further illustrate the effect of preprocessing on the spectral data.
Figure 8:
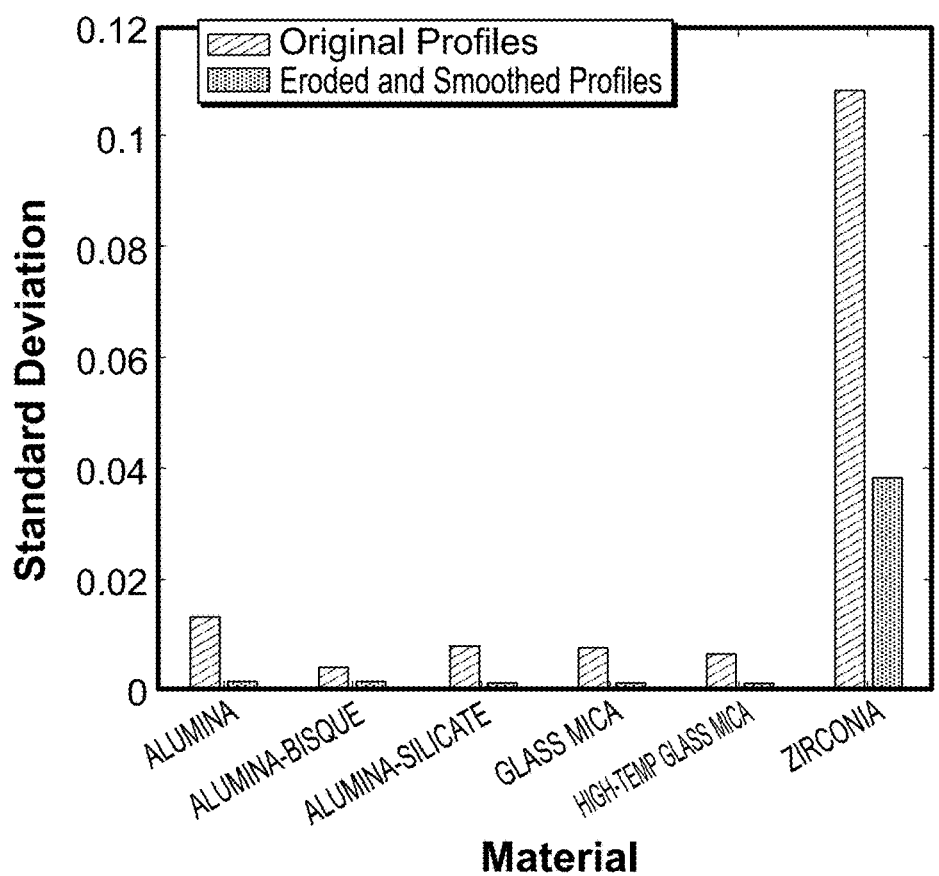

This is further illustrated in FIGS. 7 and 8. FIG. 7 is a comparative bar graph in which the mean pixel value for each of the six ceramic materials as measured before pre-processing is paired with the corresponding mean pixel value after erosion and smoothing. FIG. 8 is a comparative bar graph in which the respective standard deviations of the values in FIG. 7 as measured before pre-processing are paired with the corresponding standard deviations after erosion and smoothing.

It may be noted, with reference to the figures, that the zirconia cylinder exhibits the greatest statistical variability. We attribute this to the significant artifacts present on the edges of that cylinder Iterative Hierarchical Clustering.

We now describe the algorithm that we applied for iterative hierarchical clustering. Initially, the user must define the parameter NUMCLUSTERS, which specifies how many clusters the algorithm will identify. As noted above, we used a single-linkage agglomerative hierarchical clustering algorithm in each iteration.

Figure 9:
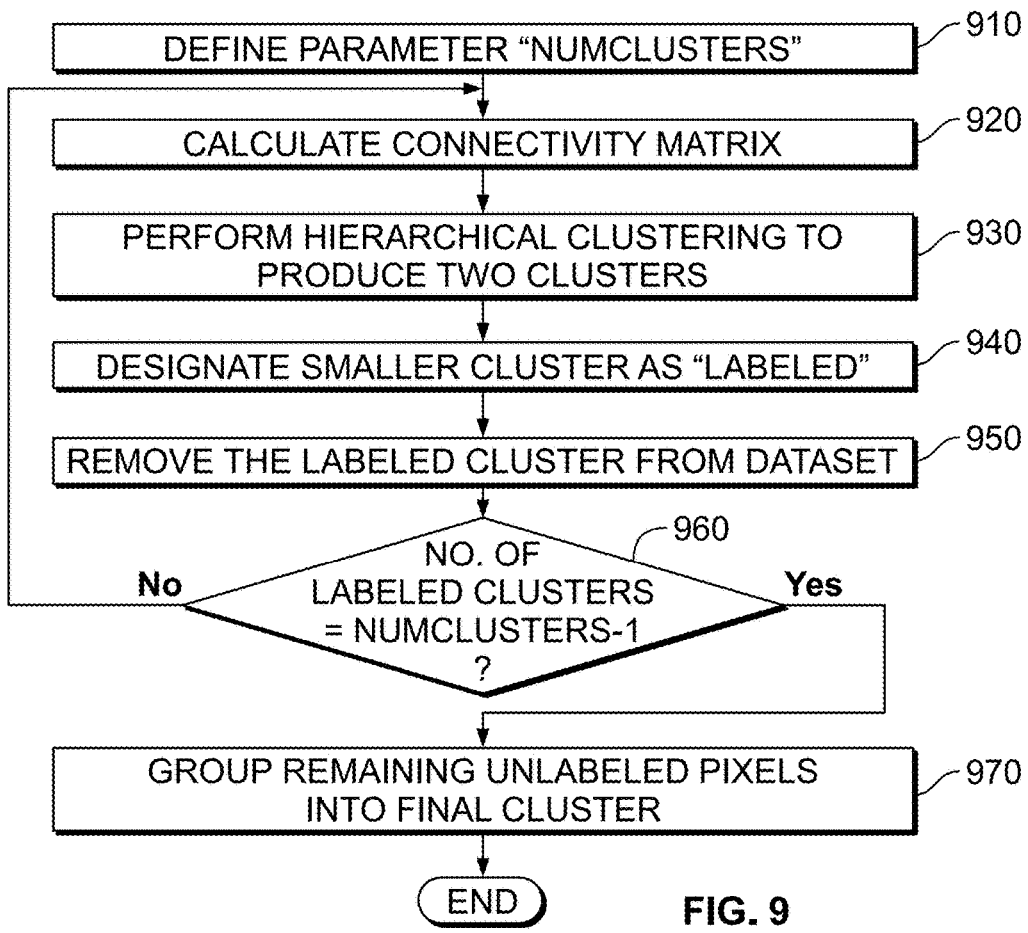
FIG. 9 is a flowchart illustrating an example of iterative hierarchical clustering.

Our algorithm for iterative hierarchical clustering, which is provided here as a non-limiting example, is described below with reference to the flowchart of FIG. 9. The numbering used below for the steps of the algorithm correspond to the reference numerals in the flowchart.

Algorithm IHC:

910. Define parameter NUMCLUSTERS.

920. Calculate the connectivity matrix by finding the pairwise Euclidean distances between all elements of the spectral data, i.e., the pairwise distance between all profiles.

930. Perform hierarchical clustering to produce two clusters.

940. Designate the smaller of the two clusters as labeled. Record the pixels belonging to the labeled cluster. The pixels belonging to the larger of the two clusters are considered unlabeled.

950. Remove the pixels in the labeled cluster from the dataset, thereby forming a reduced dataset.

960. Iterate Steps 920-950. Continue until the steps have been iterated NUMCLUSTERS-1 times, so that NUMCLUSTERS-1 labeled clusters have been formed.

970. Group together all pixels that remain unlabeled. These remaining pixels constitute the final cluster. The final cluster may optionally be deemed "labeled" or "unlabeled".

The above procedure assigns every point to a cluster, including potential outliers. Further analysis may be done on the points that remain unlabeled after Step 960 to identify outliers. It should also be noted that that some initial analysis will also be needed in order to place a value on the NUMCLUSTERS parameter.

A "label" may be understood, in this regard, as a presumptive material. The presumption follows from a statistical commonality among the data points that are mapped to a particular label.

Variations of Iterative Hierarchical Clustering.

The above algorithm can be applied solely to the pixel profiles, so that only spectral data are used to find similarity between data points. Alternatively, however, spatial data can also be incorporated. This could help to differentiate pixels that are spectrally similar but spatially distinct.

Incorporating spatial data would also explicitly take it into account that pixels located near each other in a scan are more likely to be composed of the same material than pixels that are distant from each other.

Also, clustering based on high-dimensional data can encounter difficulties because the distance metrics fail to adequately capture the similarity between data points, or because the high dimensionality adds irrelevant information that hinders the clustering process. Incorporating a spatial similarity metric can help to address these issues.

In fact, there are known image segmentation algorithms that combine spectral data with spatial data. However, these relate to centroid-based clustering algorithms, which might not work well in contexts such as that of our example of ceramic cylinders. Algorithms of that kind are discussed, for example, in Keh-Shih Chuang et al., "Fuzzy c-means clustering with spatial information for image segmentation, *Computerized Medical Imaging and Graphics,* 30:9-15, (2006), and in J. Zexuan et al., "Fuzzy c-means clustering with weighted image patch for image segmentation," *Applied Soft Computing,* 12:1659-1667 (2012).

There are multiple options for incorporating spatial data into the iterative hierarchical clustering process. In a conceptually simple approach, ambiguous points are subjected to a majority vote. That is, such a point is assigned to the same cluster as the majority of its near neighbors in space.

One more advanced method is to calculate an additional connectivity matrix, where the elements of this second matrix are the pairwise Euclidean distances between all elements of the spatial data. These elements are then treated as weights for the values in the spectral data connectivity matrix which, in turn, are rescaled to values between 0 and 1. To combine the spectral data connectivity matrix with the spatial data connectivity matrix, the Hadamard product is taken between them. Hierarchical clustering is performed using the combined connectivity matrix.

In another option, the 128-dimensional profile vector of each pixel is augmented with the two-dimensional spatial data vector corresponding to the pixel's coordinates. (The spatial vectors may need to be rescaled to the range of the minimum and maximum values in the spectral data, if there is a large difference in scale.)

An alternative implementation of iterative hierarchical clustering may be advantageous if the clusters are uniform in size, and if the number of points in a cluster can be accurately estimated. In this alternative implementation, a further parameter MINPOINTS is added. The MINPOINTS parameter specifies a minimum number of points that are needed to form a cluster.

In an example algorithm that incorporates the MINPOINTS parameter, hierarchical clustering is again used within each iteration to form two clusters, one of the resulting clusters is removed from the dataset, and the other of the resulting clusters is subjected to a further iteration.

Within each iteration, traditional agglomerative hierarchical clustering (AHC) is performed to form N clusters. Initially (within each given iteration), N=2. If the number of points in the smaller of the two resulting clusters is at least MINPOINTS, those points are deemed "labeled" and removed from the dataset, and the remaining datapoints are subjected to a new iteration of the algorithm.

However, if the smaller of the two clusters does not contain at least MINPOINTS datapoints, then the AHC is repeated with N increased to 3. If the total number of datapoints in the two smallest of the resulting clusters is at least MINPOINTS, the two smallest clusters are merged into a labeled cluster, their datapoints are removed from the dataset, and the remaining datapoints are subjected to a new iteration.

More generally, the AHC is repeated (within each given iteration) with increasing values of N until the total number of datapoints in the N−1 smallest clusters are at least MINPOINTS. When that threshold is reached, the N−1 smallest clusters are merged into a labeled cluster, their datapoints are removed from the dataset, and the remaining datapoints are subjected to a new iteration.

The procedure is iterated until the number of labeled clusters formed is NUMCLUSTERS. The algorithm is summarized as follows:

Algorithm Minpoints:
(1) Set NUMCLUSTERS, set MINPOINTS.
(2) Initialize N=2
(3) Perform AHC to form N clusters.
(4) Find the total number $\Sigma$ of pixels summed over the N−1 smallest clusters.
(5) If $\Sigma \geq$ MINPOINTS, define the summed points as a labeled cluster, remove them from the data set, and go to Step (7). Otherwise, go to Step (6).
(6) Increment N and go to Step (3).
(7) If the number of labeled clusters is less than NUMCLUSTERS, go to Step (2). Otherwise, STOP.

It is important to note that not all points will necessarily be labeled when using the MINPOINTS parameter. It should also be noted that MINPOINTS must be less than or equal to the size of the smallest cluster for this algorithm to perform accurately.

In our example of six ceramic cylinders, the cylinders are all of similar size. Consequently, the MINPOINTS parameter is effective for improving the performance of the iterative hierarchical clustering algorithm. By contrast, another example presented below involves concentric cylinders of different materials, in which the number of pixels corresponding to the inner material (153 pixels in an example) is significantly smaller than the number of pixels corresponding to the outer material (1335 pixels in an example). There, the unmodified version of iterative hierarchical clustering was preferred.

Application of Iterative Hierarchical Clustering

Multichannel CT data can potentially be used in the validation and verification of un-known objects. In applications of the technique, a scan of unidentified materials is compared to a scan of previously identified materials.

For example, iterative hierarchical clustering is performed on a dataset of the materials with unknown identities. The mean profiles of the pixels in each assigned cluster are calculated, and they are compared to mean profiles of known materials.

Accordingly, an example algorithm uses two sets of data to identify unknown materials: testing data (for the unknown materials) and training data (for the known materials). In addition to the parameters in the iterative hierarchical clustering algorithm, two further parameters X and N are required: X identifies a subset of channels selected to ignore noise in lowest and highest channels, and N is the degree of a polynomial that parametrizes the profiles, as explained below.

Figure 10:
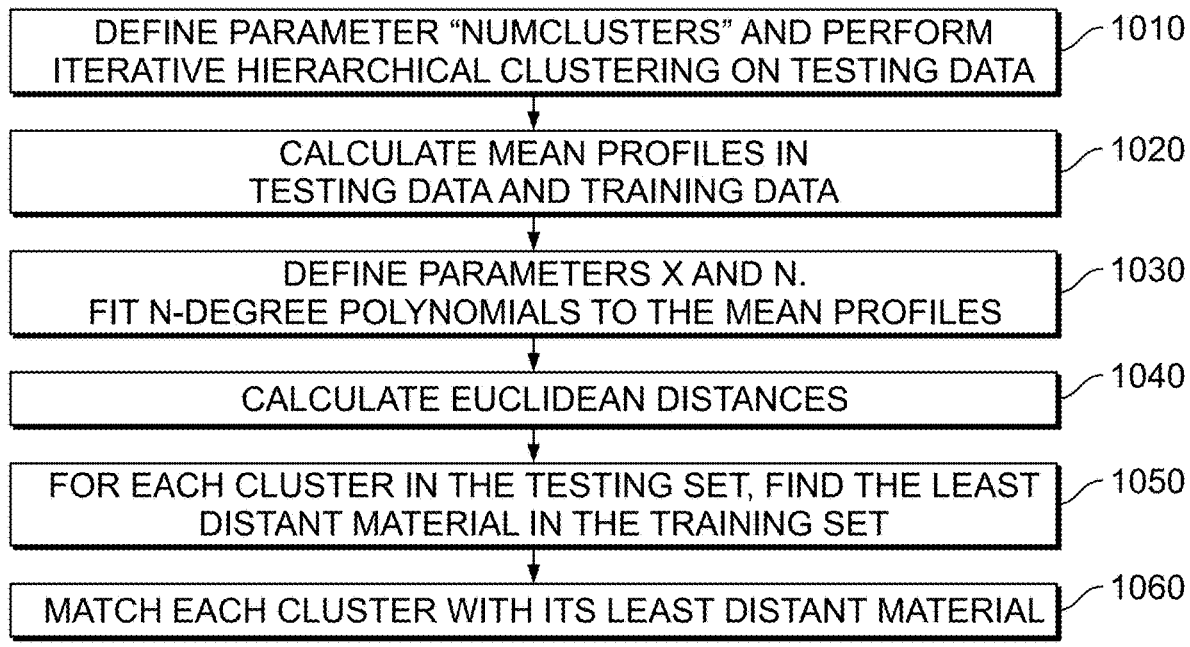
FIG. 10 is a flowchart illustrating an example algorithm for inferring material compositions using iterative hierarchical clustering.

An example algorithm for inferring material compositions is described below with reference to the flowchart of FIG. 10. The numbering of the steps in the algorithm, below, corresponds to the reference numerals in the flowchart.

Algorithm Material-Inference:

1010. Define the parameter NUMCLUSTERS and perform iterative hierarchical clustering on the testing data.

1020. Find the mean profiles of the clusters in the testing data, and find the mean profile of each known material in the training data.

1030. Define the parameters X and N. Fit an N-degree polynomial to the portion specified by X of each mean profile in the testing and training data.

1040. Take the vectors consisting of the polynomial coefficients corresponding to the mean profiles. Calculate the Euclidean distance between the polynomial coefficients corresponding to each mean profile in the testing data and the polynomial coefficients corresponding to each mean profile in the training data.

1050. For each cluster in the testing set, use the distances calculated in Step 4 to identify the least distant material in the training set.

1060. Match each cluster with its least distant material.

Example 1: Material Identification for Six Ceramic Cylinders

Purity Metric.

In our tests using six ceramic cylinders, each cylinder was composed of a different material. Therefore, we measured how effective algorithms were for making material inferences according to how well they would produce one-to-one correspondences between labeled clusters and assigned materials. We quantified these correspondences by using a measure $\mathcal{P}$ that we refer to as "purity". We used two versions of $\mathcal{P}$: One measuring the mapping of labels to materials, and the other measuring the mapping of materials to labels.

A general definition of purity is $$\mathcal{P}(\Omega, C) = \left(\frac{1}{N}\right) \sum_{i=1}^{K} \max_{j=1}^{J} (\omega_i \cap c_j),$$

where $\Omega = \{\omega_1, \omega_2, \ldots, \omega_K\}$ is a collection of domain sets, $C = \{c_1, c_2, \ldots, c_J\}$ is a collection of range sets, $\omega_i \cap c_j$ is the number of points in set $\omega_i$ that are mapped to set $c_j$, and N is the total number of data points. It will be evident that for any mapping, the purity value must be on the range from 0 to 1.

We designated an algorithm as having high material purity if, substantially, each material is mapped to only one labeled cluster. Conversely, the material purity is low if the algorithm tends to spread each material among several labeled clusters. To evaluate material purity, $\Omega$ is taken as the collection of materials and C is taken as the collection of labels. Hence, in the above summation, the full population of a material category $\omega_i$ is counted if, and only if, it is all mapped to one labeled cluster.

On the other hand, we designated an algorithm as having high label purity if each label is mapped, substantially, to only one material. Conversely, the label purity is low if the algorithm tends to spread each label among several materials. To evaluate label purity, $\Omega$ is taken as the collection of labels and C is taken as the collection of materials. Hence, in the above summation, the full population of a cluster $\omega_i$ is counted if, and only if, it is all mapped to one material.

Results.

Table I presents comparative results, in terms of the purity figure, that were obtained from different algorithmic approaches to material identification from the CT scans. Results are presented for agglomerative hierarchical clustering, k-means clustering, DBSCAN, and our new iterative hierarchical clustering.

TABLE I

Purity values for tested clustering algorithms on ceramic cylinders data

| Clustering Algorithm | Material Purity | Label Purity |
| --- | --- | --- |
| Hierarchical | 0.9920 | 0.3851 |
| k-Means | 0.8784 | 0.6912 |
| DBSCAN | 0.9869 | 0.6788 |
| Iterative Hierarchical | 1 | 1 |

It will be seen with reference to the table that iterative hierarchical clustering performed significantly better than the other algorithm that are represented. Specifically, using parameters of NUMCLUSTERS=6 and MINPOINTS=150, each label corresponded to a single material and each material corresponded to a single label, which signifies accuracy of the clusters. Twenty-one points remained unlabeled at the completion of the procedure.

Figure 11:
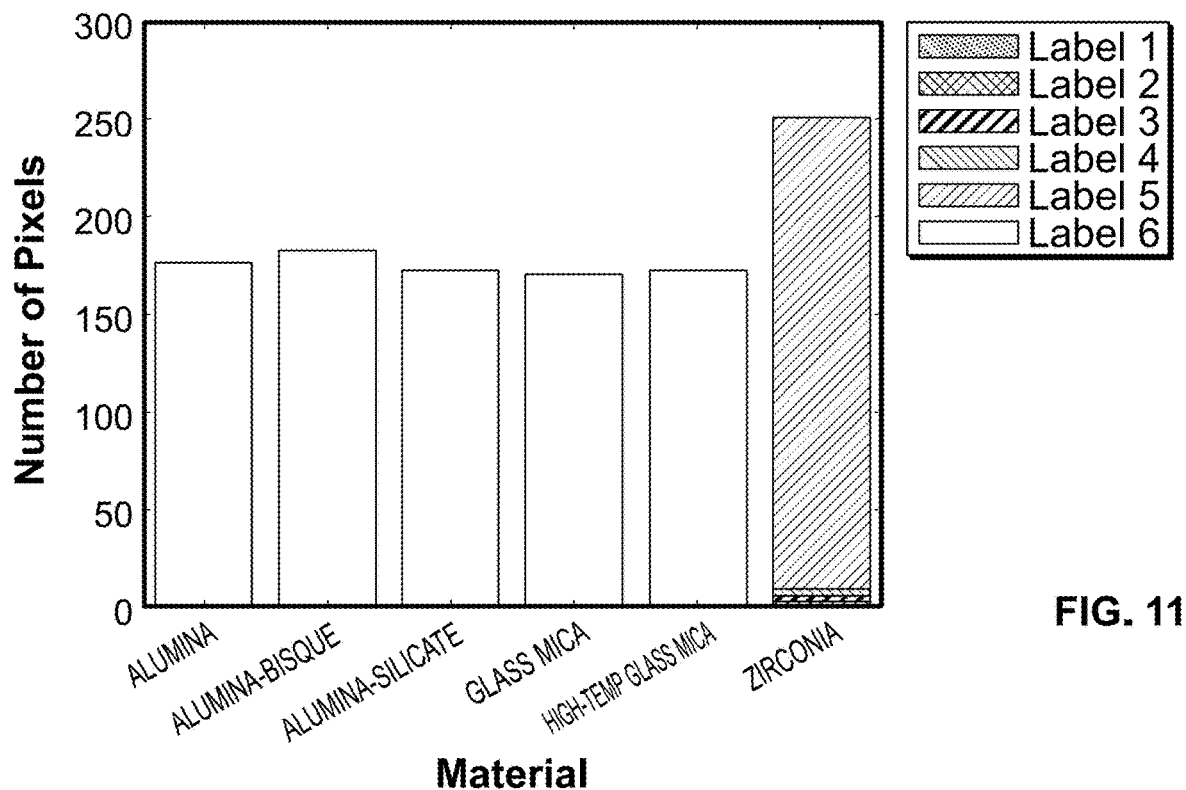
FIGS. 11-14 illustrate the effectiveness of several different clustering algorithms for assigning labels to the six ceramic materials of the preceding figure.
Figure 12:
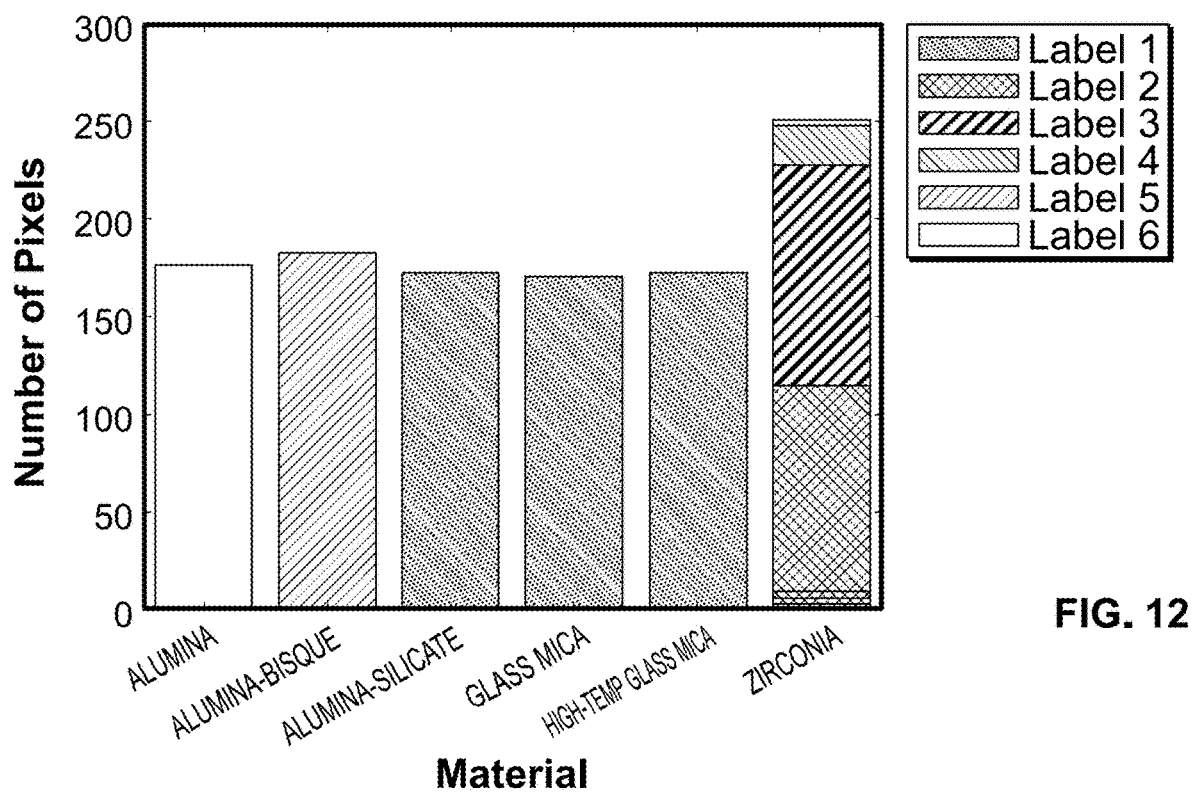
Figure 13:
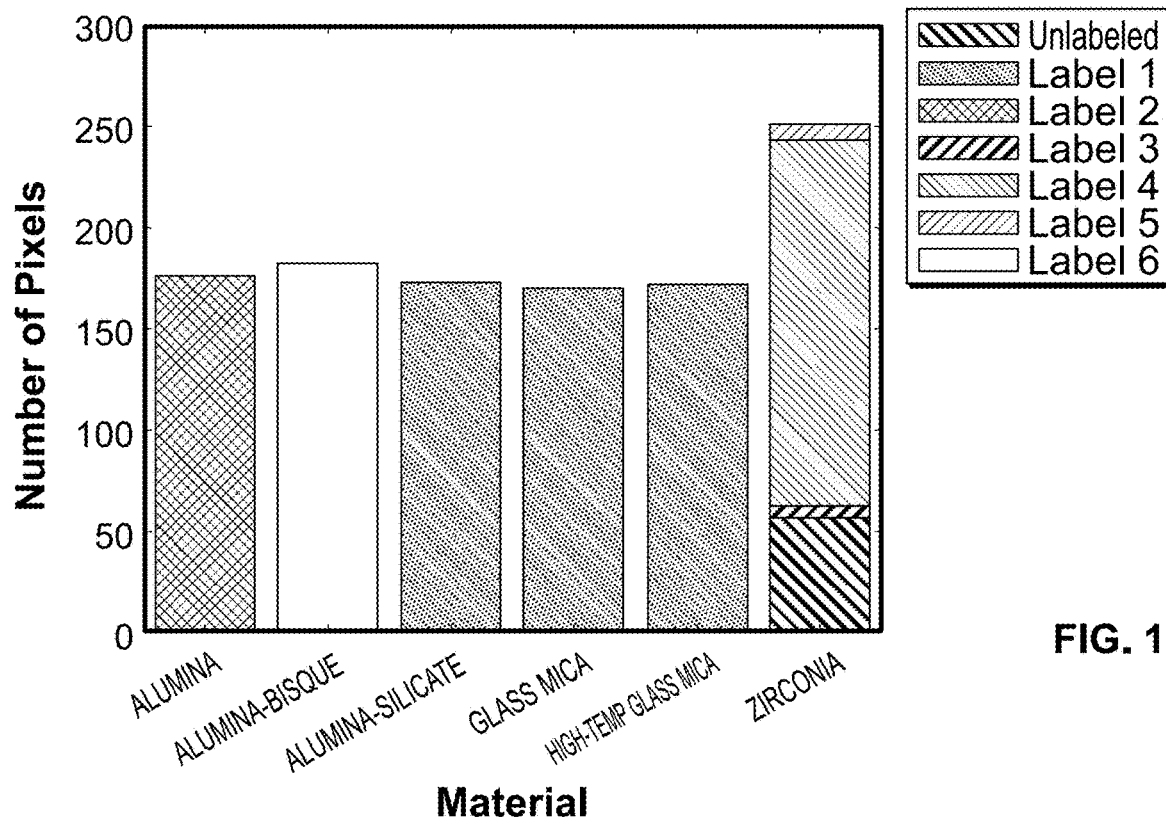
Figure 14:
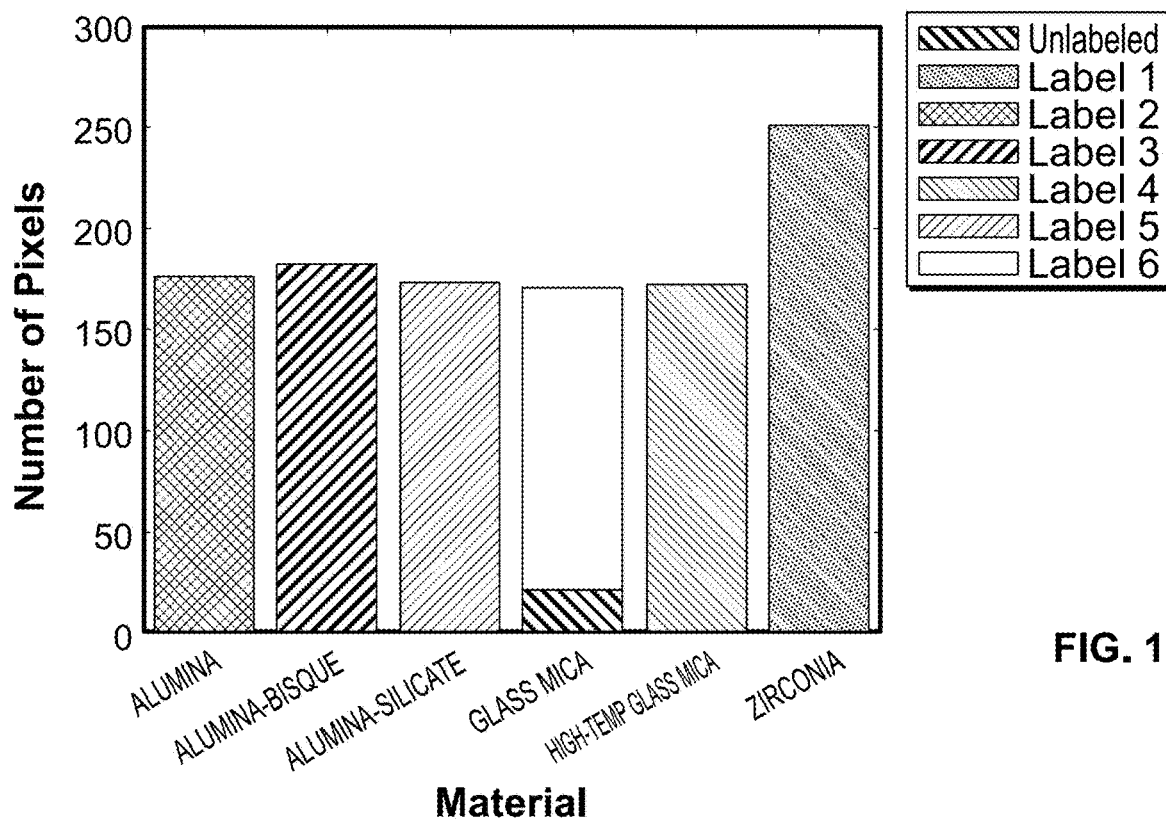

Label assignments for each of the six materials are shown in FIGS. 11-14. FIG. 11 shows the label assignments under agglomerative hierarchical clustering. FIG. 12 shows the label assignments under k-means clustering. FIG. 13 shows the label assignments under DBSCAN. FIG. 14 shows the label assignments under our new iterative hierarchical clustering.

It should be noted that not every point is necessarily assigned a label with use of the DBSCAN algorithm or with use of the iterative hierarchical clustering algorithm incorporating the MINPOINTS parameter.

We also tested a variation of iterative hierarchical clustering that incorporates spatial data. The algorithm performed with 100% accuracy. Because the MINPOINTS parameter was not used, every point in the dataset was assigned a label. We found that for iterative hierarchical clustering to perform with 100% accuracy on this dataset, we needed to include at least one of the following two techniques: using the MINPOINTS parameter and incorporating spatial data.

Example 2: Material Identification in Concentric Cylinders

Two materials are arranged concentrically with contact between them, to form a nested annular cylinder. This object is chosen because it is composed of multiple distinct materials of different densities, arranged in a complex geometry. The annular shape, in particular, was considered likely to increase the incidence of beam-hardening artifacts. Also, the contact between materials was expected to cause obfuscation, adding further difficulty to the task of material identification.

Figure 15:
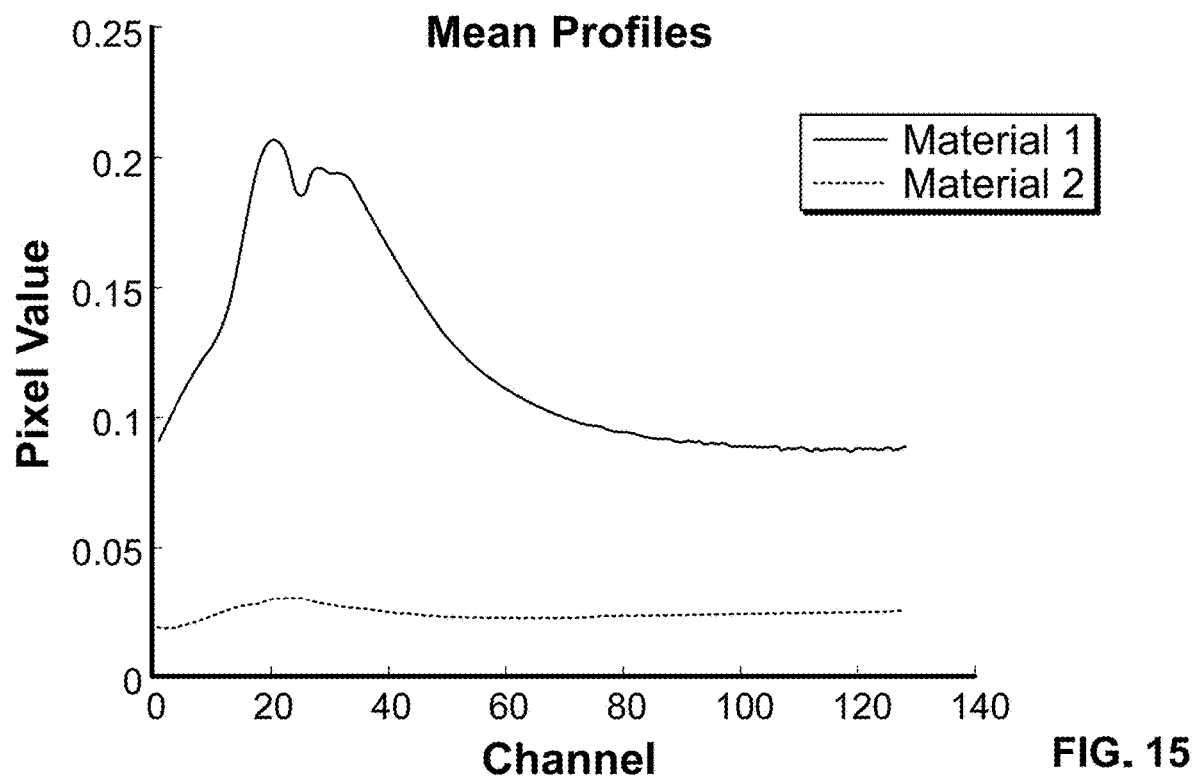
FIG. 15 is an example of spectral data for an example test object consisting of a nested cylinder that comprises two materials of different densities. Each of the two curves in the figure is a mean profile of one of the two nested materials.

FIG. 15 is an example of spectral data for the nested cylinder. Each of the two curves in the figure is a mean profile of one of the two nested materials. It will be apparent from the figure that the respective materials have distinct spectra.

Figure 16:
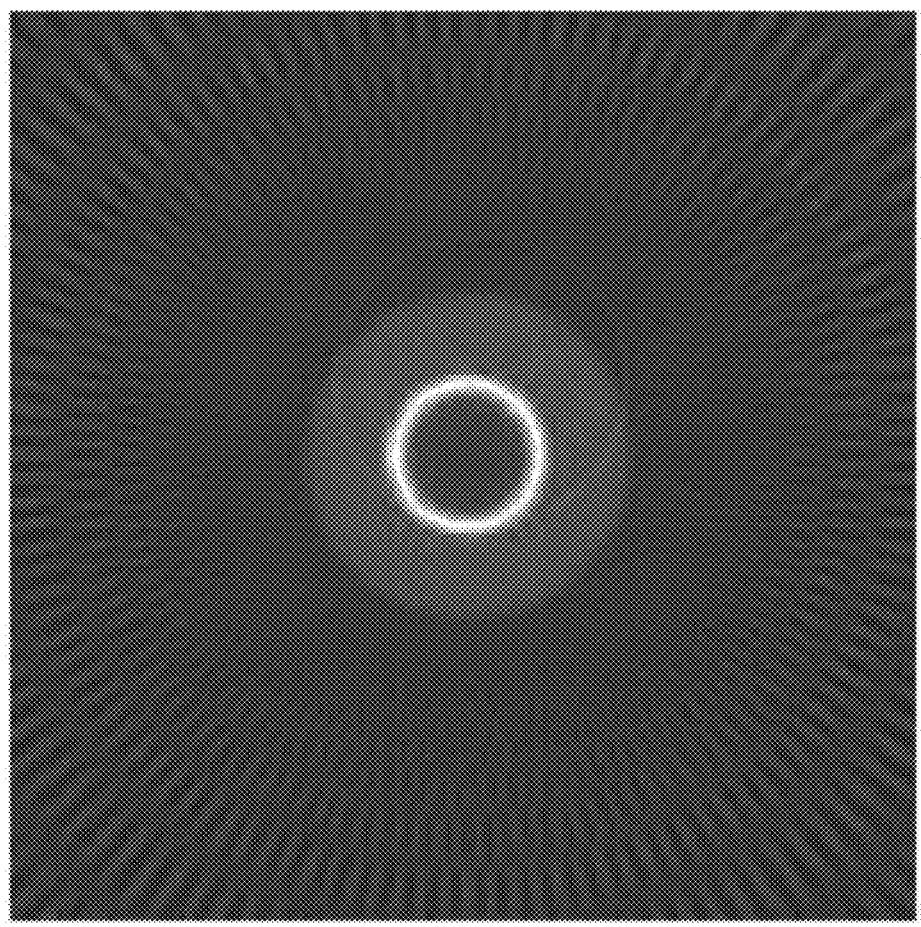
FIG. 16 is an example CT radiograph of a nested annular cylinder used as a test object.

FIG. 16 is an example CT radiograph of a nested annular cylinder used in our studies.

The datasets for the nested annular cylinder were acquired using the x-ray scanning system described above. The data were collected at 400 keV and 2.3 mA with a source-to-object distance of approximately 0.64 meters.

Because of the complex annular geometry, we were unable to apply conventional binary image erosion in the preprocessing step. Instead, to replicate the erosion process, the pixels on the outer border of the concentric cylinder and the pixels on the edges between materials were identified using multilevel thresholding, and they were removed from the scan.

For comparison with iterative hierarchical clustering, we also applied traditional agglomerative hierarchical clustering, k-means clustering, and DBSCAN clustering to the concentric cylinder dataset. All of these algorithms performed with 100% accuracy, producing a one-to-one relationship between materials and labels. The most likely explanation for this perfect accuracy is that the two nested materials are spectrally very distinct. Our results are shown in Table II.

TABLE II

Purity values for tested clustering algorithms on concentric cylinders data

| Clustering Algorithm | Material Purity | Label Purity |
|---|---|---|
| Hierarchical | 1 | 1 |
| k-Means | 1 | 1 |
| DBSCAN | 1 | 1 |
| Iterative Hierarchical | 1 | 1 |

Example 3: Single-Channel Computed Tomography

As noted above, conventional CT scans are generally performed using broadband detection across the spectral range of bremsstrahlung radiation. As CT scans of this kind perform detection in a single, broad channel, we refer to them here as "single-channel CT scans" to distinguish them from the multichannel scans reported here.

We simulated single-channel scans by summing the pixel values across all channels for each pixel in the scan. The resulting scans served as a basis for comparing single-channel performance with multichannel performance. We performed such comparisons on scans of the ceramic cylinders with and without the steel penny and wood block, and on scans of the concentric cylinder.

To make the multichannel CT data and the single-channel CT data as comparable as possible, the same pre-processing that was performed on the multichannel CT data was performed on the single-channel CT data for both the concentric cylinder dataset and the ceramic cylinders dataset.

For the concentric cylinder data, both k-means clustering and iterative hierarchical clustering produced the same results with the single-channel data as with the multichannel data. Accuracy in both cases was 100%.

For the ceramic cylinders data, the performance of the k-means clustering on single-channel data was similar to its performance on multichannel data. The iterative hierarchical clustering (using parameter values of NUMCLUSTERS=6 and MINPOINTS=150) performed better on the multichannel data than it did on the single-channel data. On the single-channel data, however, iterative hierarchical clustering still performed better than the k-means clustering.

Table III summarizes the purity values for the single-channel concentric cylinder and ceramic cylinders datasets.

TABLE III

| Clustering Algorithm | Concentric Cylinder Data | | Ceramic Cylinders Data | |
|---|---|---|---|---|
| | Purity | Label Purity | Purity | Label Purity |
| k-Means | 1 | 1 | 0.8698 | 0.6879 |
| Iterative Hierarchical | 1 | 1 | 0.8734 | 0.8734 |

Figure 17:
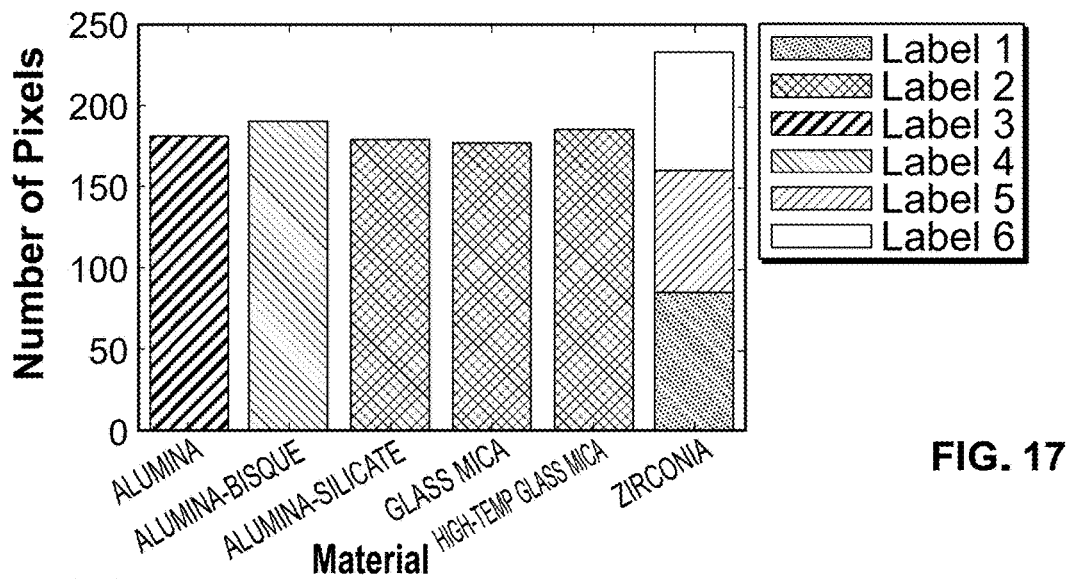
FIGS. 17 and 18 illustrate the effectiveness of two different clustering algorithms for assigning labels to the respective materials of the nested cylinder of the preceding figure.
Figure 18:
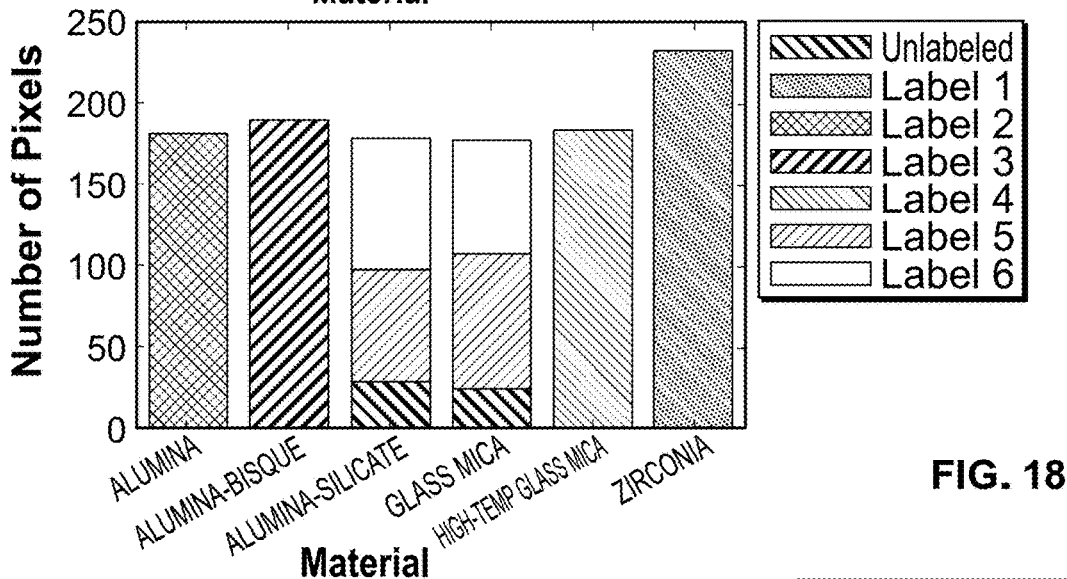

FIGS. 17 and 18 show the label assignments under k-means clustering and iterative hierarchical clustering, respectively, for the single-channel ceramic cylinders dataset.

Example 4: Identification of Unknown Materials

We performed multichannel scans of the ceramic cylinders with the addition of the steel penny and wood block as the testing data, and we analyzed them with iterative hierarchical clustering using the six ceramic cylinders without the penny and wood block to generate the training data. Both datasets were pre-processed using the methodology described above.

The iterative hierarchical clustering was performed using the parameter NUMCLUSTERS=7. Because only 61 pixels belonged to the steel penny, which is fewer than the number (average 185) of pixels belonging to each ceramic cylinder, we did not use the MINPOINTS parameter. The mean profile matching algorithm was performed with the parameters X=[10, 80] and N=4.

Figure 19:
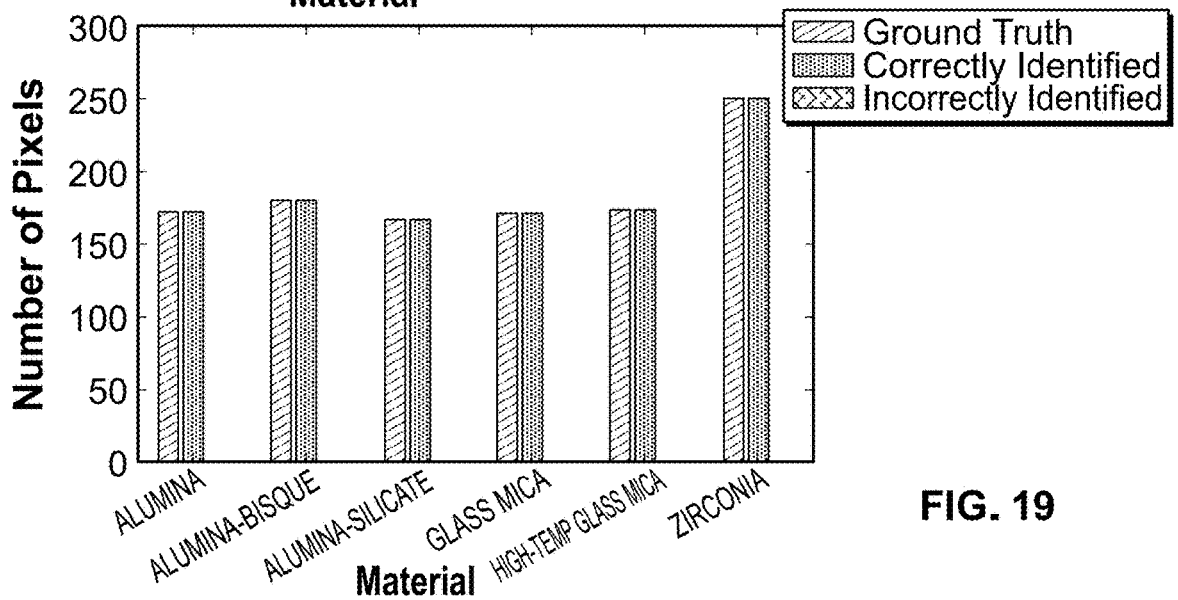
FIG. 19 is a comparative bar graph in which, for each of the six materials, a bar representing the number of pixels in the testing set that were correctly identified is juxtaposed to a bar representing the ground truth. (In the case of an imperfect match, the graph would include a third bar representing, for each material, the number of pixels that were incorrectly identified.)

FIG. 19 is a comparative bar graph in which, for each of the six materials, a bar representing the number of pixels in the testing set that were correctly identified is juxtaposed to a bar representing the ground truth. As seen in the figure, pixels in the testing set were matched to their corresponding materials in the training set with 100% accuracy. (In the case of an imperfect match, the graph would include a third bar representing, for each material, the number of pixels that were incorrectly identified.)

Figure 20A:
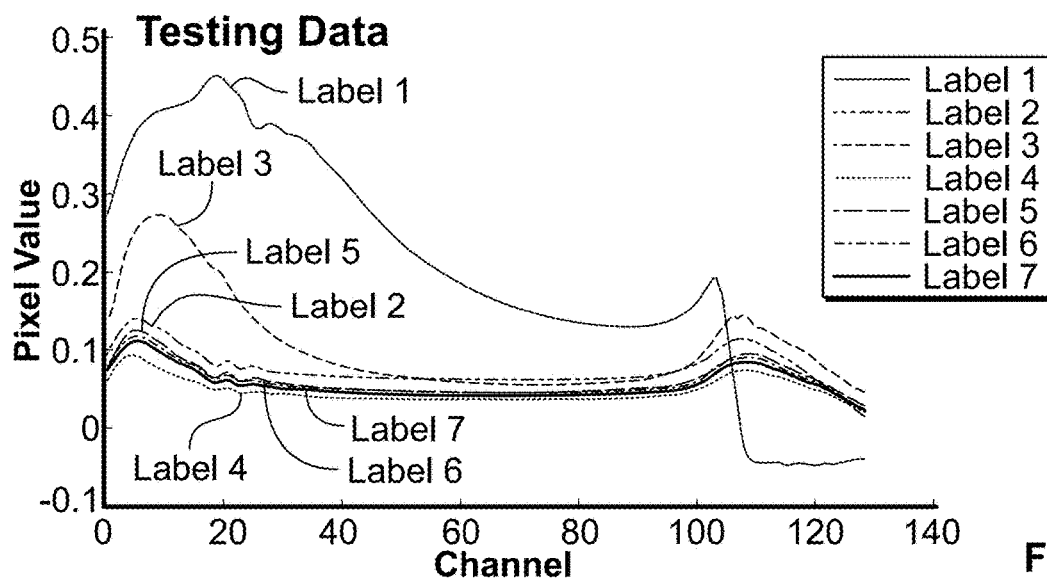
FIGS. 20A-20C illustrate the process of identifying the materials in the testing data by comparing mean profiles.
Figure 20B:
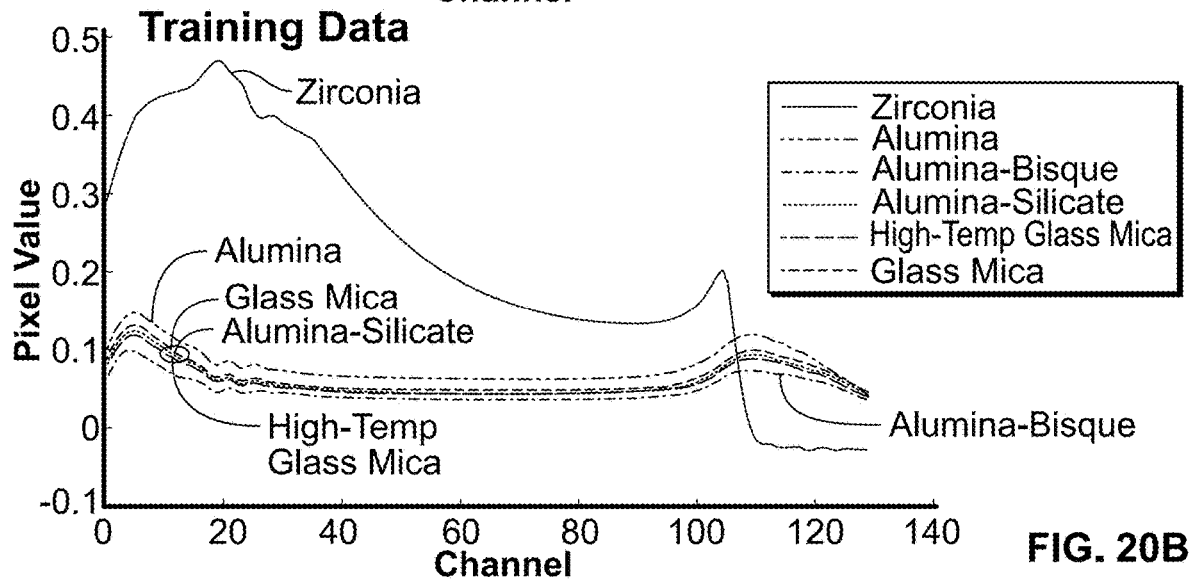
Figure 20C:
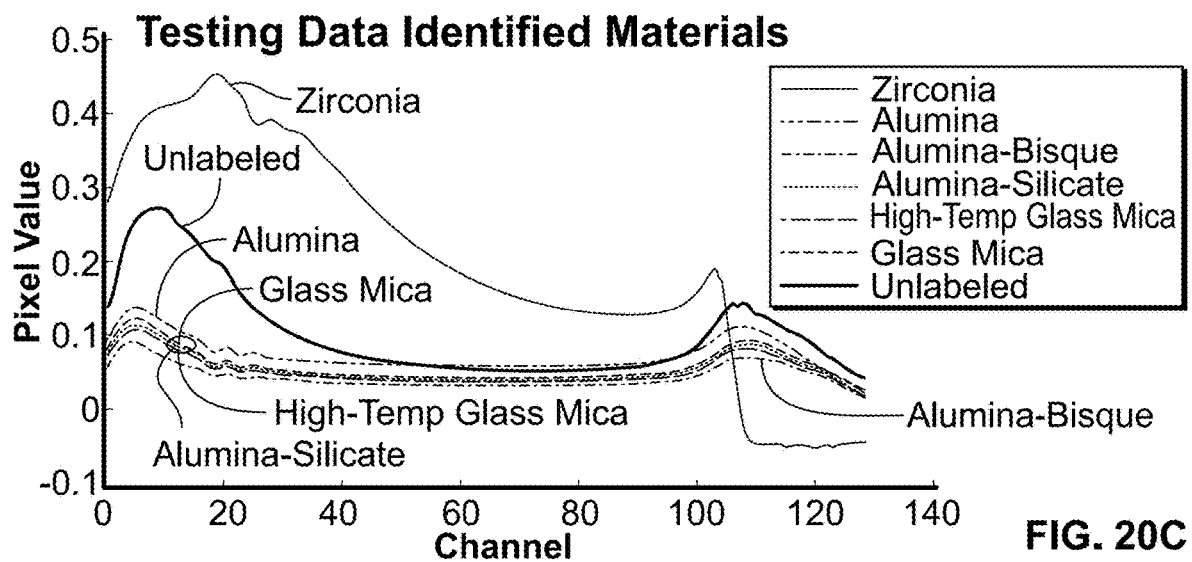

The process of identifying the materials in the testing data by comparing mean profiles is illustrated in FIGS. 20A-20C. (The wood block was used for obfuscation, but it was not one of the assigned materials in the material inference process.) FIG. 20A shows profiles from the testing data. From top to bottom, these profiles have labels 1, 3, 2, 5, 6, 7, and 4. (The profile for label 5 is partially visible near labels 2 and 6.) FIG. 20B shows profiles from the training data. It is identical to FIG. 3, discussed above. FIG. 20C shows the material identifications made on the testing data. From top to bottom, the identified materials are zirconia, "unlabeled", alumina, glass mica, high-temperature glass mica, and alumina bisque. The identified profile for alumina-silica is partially visible near the profiles for glass mica and high-temperature glass mica.

We also applied the material inference process to the single-channel ceramic cylinders datasets. We found that the iterative hierarchical clustering performed very poorly on the single-channel ceramic cylinders data when the steel penny and wood block were included. As a consequence, we added further erosion, after the initial pre-processing, to improve the clustering performance.

It is also significant that the polynomial fitting process could not be applied to the single-channel data, since only a single exposure value was associated with each pixel instead of a vector profile. In place of the polynomial fitting process, we compared the mean values for the pixels in each cluster to the mean values for each known material to determine which cluster corresponded to which material.

Only alumina-bisque and zirconia were correctly identified before the extra erosion, but after the extra erosion, alumina, alumina-bisque, glass mica, high-temperature glass mica, and zirconia were all also correctly identified. However, alumina-silicate was incorrectly identified as glass mica, and the steel penny was incorrectly identified as alumina.

Figure 21:
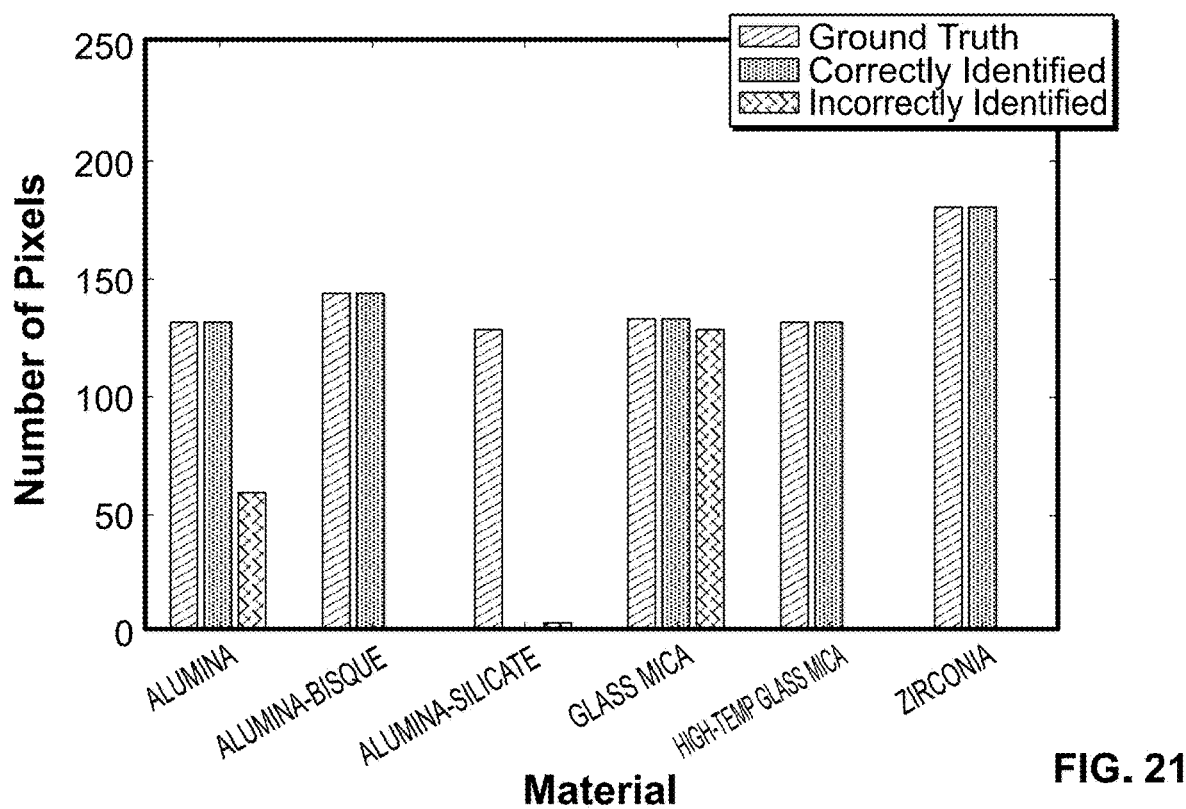
FIG. 21 illustrates the accuracy of material identification that we performed using single-channel data.

FIG. 21 illustrates the accuracy of material identification that we performed using single-channel data. FIG. 21 is a comparative bar graph in which, for each of the six materials, a bar representing the number of pixels in the testing set that were correctly identified is juxtaposed to a bar representing the number of pixels that were incorrectly identified, and a bar representing the ground truth.

Our results demonstrated that the iterative hierarchical method has promise for material inference, given a testing set and a training set. However, the multichannel spectral data might be desirable if this task is to be performed with very high accuracy.

Example 5: Identification of Materials in Raw Scan

We tested material inference on the ceramic cylinders data by iterative hierarchical clustering, using raw testing data, i.e., testing data that had not been subjected to pre-processing. Accordingly, the profiles for every pixel in a reconstructed scan, rather than only the profiles of the pixels identified in the pre-processing methodology, were compared to the mean profiles of known materials in the training data.

To perform the comparison, each profile in the testing data and each mean profile in the training data was fitted with an N-degree polynomial, and the distances between polynomial coefficients were computed. Each pixel was labeled with the material in the training data corresponding to the shortest distance between polynomial coefficients.

From each set of profiles in the testing data that were mapped to a particular mean profile in the training data, we kept only those profiles that fell within a certain standard deviation of the mean training data profile. The pixels whose testing data profiles fell outside of this threshold were categorized as unlabeled.

These unlabeled pixels were then analyzed to determine whether they corresponded to new materials in the testing data that were not present in the training data.

We took a 128-dimensional zero vector to represent a pixel corresponding to air. We calculated the distances between the unlabeled profiles and this zero vector, and we calculated the mean value and standard deviation of those distances. We set a threshold at a certain multiple of the standard deviation. Those unlabeled profiles that deviated from the mean distance by more than the threshold were categorized as new materials.

We performed the above process using testing data from a raw scan of the ceramic cylinders with the steel penny and wood block added. We used a pre-processed scan of the ceramic cylinders (without the penny or wood block) for the training data.

Using parameters X=[10, 80] and N=4, and using a threshold of two standard deviations from the mean, only alumina-bisque was correctly identified with 100% accuracy. Initial analysis showed that artifacts on the edges of the cylinders contributed to inaccuracies in the performance of the material inference process.

Figure 22:
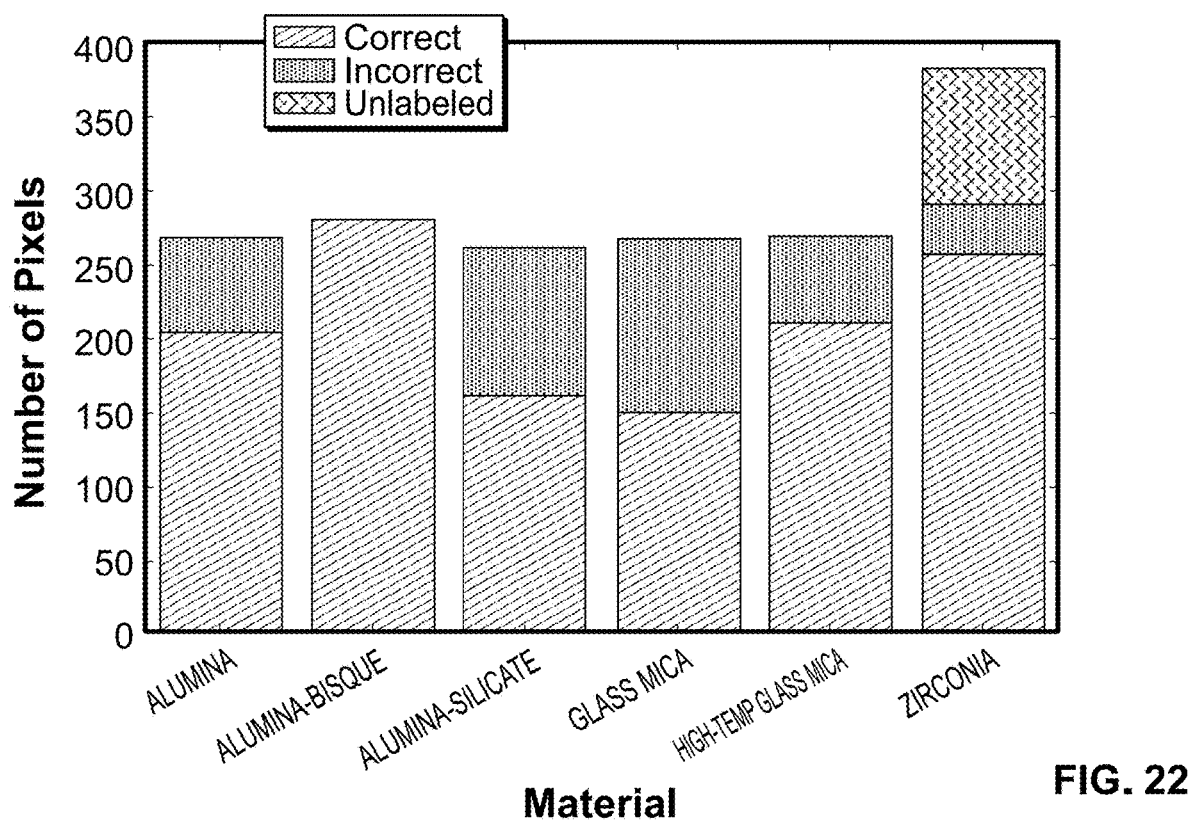
FIG. 22 shows the accuracy of the material inference process.

FIG. 22 shows the accuracy of the material inference process. FIG. 22 is a bar graph in which each bar represents a respective one of the six materials. Each bar is partitioned among the number of pixels correctly identified, the number of pixels incorrectly identified, and the number of pixels that remained unlabeled. The pixels corresponding to the zirconia cylinder that are denoted in the figure as "unlabeled" were classified as a new material.

Figure 23:
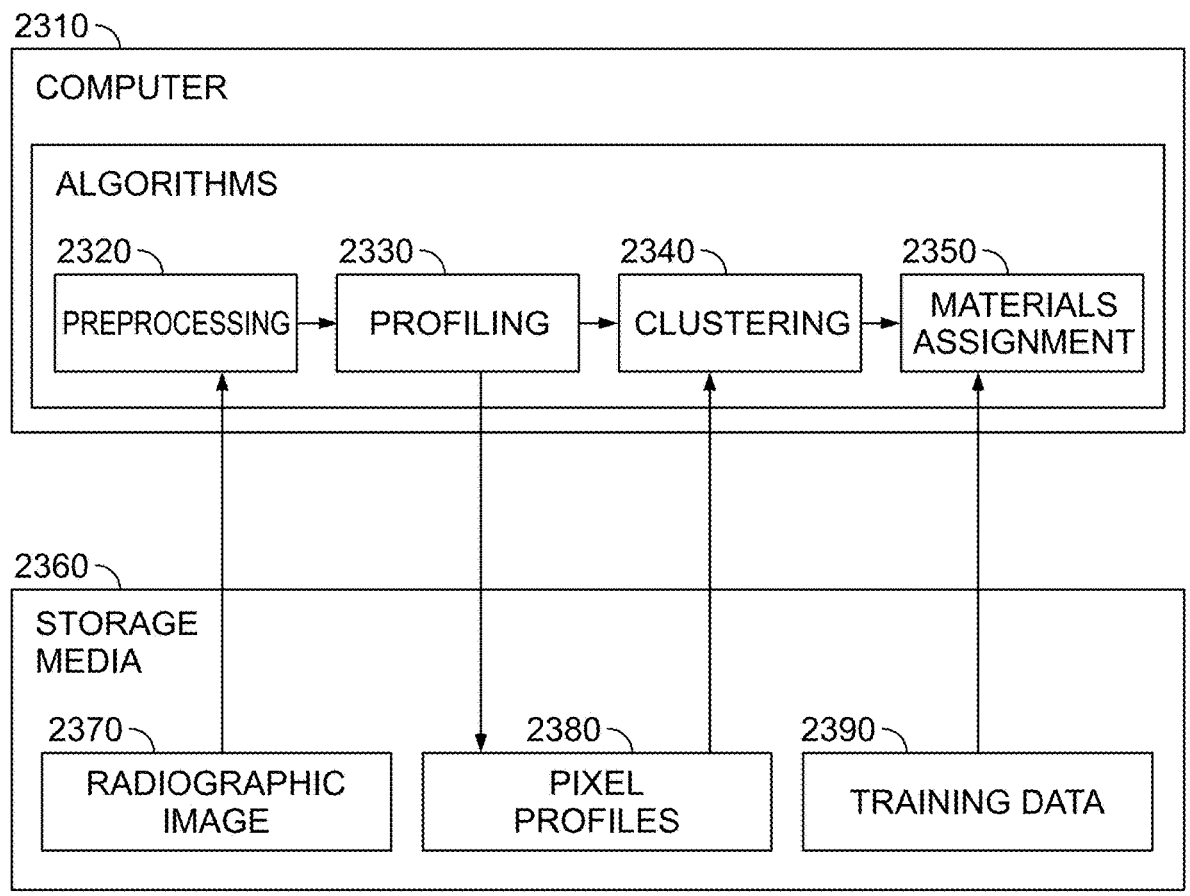
FIG. 23 is a block diagram of an example system for performing the methods described here.

The methods described here can be carried out by a general-purpose computer or by any of various alternative digital data-processing devices. Solely for purposes of illustration, FIG. 23 provides a non-limiting example of a possible system for carrying out these methods.

As seen in the figure, computer 2310 is programmed with algorithms for preprocessing 2320, profiling of pixels 2330, clustering 2340, and associating materials with labels 2350. The storage media 2360 include a medium 2370 for storing the radiographic image and a medium 2380 for storing the profiles. Additionally, a medium 2390 can be provided for storing parameters, obtained from training data, that identify particular material compositions.

Horizontal arrows in the figure represent the flow of control, and vertical arrows represent the flow of data between the processor and the storage media.

We claim:

1. A method, comprising:
creating a profile for each pixel in a plurality of pixels that belong to a spectral radiographic image;
clustering the plurality of pixels, wherein the clustering is based on the pixel profiles, and whereby one or more clusters are defined; and
assigning labels to one or more of the defined clusters, whereby one or more labeled clusters are defined;
wherein:
each of the profiles comprises a vector of radiographic exposure values taken in different energy channels;
the spectral radiographic image is stored in a digital medium accessible by a computer;
the profiles are stored in a digital medium accessible by a computer; and
the clustering comprises iterative hierarchical clustering (HC) in which each of one or more iterations of an HC procedure eliminates one or more clusters from a subsequent iteration of the HC procedure.

2. The method of claim 1, further comprising:
assigning an inferred material composition, or an inference that the composition is unknown, to each labeled cluster.

3. The method of claim 1, further comprising preprocessing the spectral radiographic image before the clustering, wherein the preprocessing is performed to more distinctly define images of discrete objects.

4. The method of claim 3, wherein the preprocessing comprises multilevel thresholding, erosion, and smoothing.

5. The method of claim 1, wherein the spectral radiographic image comprises a set of reconstructed computer tomographic (CT) images of a section of a test object that are recorded in different energy channels.

6. The method of claim 5, further comprising: performing a CT exposure of the test object to produce a respective sinogram of the test object in each of the different energy channels; and processing the sinograms to produce the radiographic image.

7. The method of claim 1, further comprising:
computing a mean vector of radiographic exposure values for each of the labeled clusters; and
assigning an inferred material composition, or an inference that the composition is unknown, to each labeled cluster;
wherein the assigning of compositions to clusters is based, at least in part, on the mean vector that was computed for each labeled cluster.

* * * * *